United States Patent [19]

Alaria et al.

[11] Patent Number: 4,926,422
[45] Date of Patent: May 15, 1990

[54] ON-BOARD SWITCHING CONTROLLER FOR A SATELLITE WITH ON-BOARD SWITCHING

[75] Inventors: Gian B. Alaria; Cesare Poggio, both of Turin; Giovanni Ventimiglia, Buttigliera Alta, all of Italy

[73] Assignee: Selenia Spazio S.p.A., L'Aquila, Italy

[21] Appl. No.: 267,492

[22] Filed: Nov. 4, 1988

[30] Foreign Application Priority Data

Nov. 4, 1987 [IT] Italy .................... 67935 A/87

[51] Int. Cl.⁵ .................................. H04J 3/02
[52] U.S. Cl. ............................ 370/97; 455/12
[58] Field of Search ............ 370/97, 104, 58, 54; 455/12; 342/353, 356

[56] References Cited

U.S. PATENT DOCUMENTS

| | | | |
|---|---|---|---|
| 4,150,335 | 4/1979 | Cooperman | 370/59 |
| 4,456,988 | 6/1984 | Nakagome et al. | 455/12 |
| 4,480,328 | 10/1984 | Alaria et al. | 370/104 |
| 4,555,782 | 11/1985 | Alaria et al. | 370/104 |
| 4,628,506 | 12/1986 | Sperlick | 370/118 |
| 4,763,129 | 8/1988 | Perrotta | 370/104 |

OTHER PUBLICATIONS

International Switching Symposium 1987, pp. 834–835, New York, Alaria et al., "System Architecture, Services and Performances of the Italian Domestic Satellite Italsat".
Global Telecommunications Conferences Nov. 15–18, 1987, Tokyo, pp. 937–941, F. Marconicchio et al., "The Italsat Satellite On Board Baseband processor, Concept and Technologies".
Proceedings of the IEEE, vol. 65, No. 3, Mar. 1977, pp. 411–419, New York, U.S., Ito et al., Analysis of a Switch Matrix for an SS/TDMA System.

*Primary Examiner*—Douglas W. Olms
*Assistant Examiner*—Min Jung
*Attorney, Agent, or Firm*—Herbert Dubno

[57] ABSTRACT

A controller is provided for a baseband switching matrix with one space switching stage. The matrix supplies the controller with a number of service channels (IOTS, CH) of the uplink frames, which channels comprise encoded commands that are decoded by the controller which generates service channels (IOTD, FMC) for the downlink frames and sends them towards the matrix. The controller is subdivided into three functional units: a preprocessing unit (PREL) which decodes uplink frame service channels; a processing unit (ELAB), which receives the commands decoded by the preprocessing unit and/or by a telecontrol station with which it performs a bidirectional dialogue and generates control signals comprising the matrix switching states; and an interface unit (INTM) comprising two memories (MEMA, MEMB) alternatively operating as active or backup memory, which store the switching states supplied by the processing unit and send them to the matrix.

5 Claims, 14 Drawing Sheets

| 15 | | 11 | | 8 | | | 0 |
|---|---|---|---|---|---|---|---|
| 00 | 00 | | | ADDR1 | | | |
| 00 | BSM2 | | BSM1 | 00 | BSM4 | | BSM3 |
| 00 | BSM6 | | BSM5 | 00 | 0 0 0 | | 0 0 0 |

FIG.11

| 15 | 6 | 0 |
|---|---|---|
| 0 0 0 0 0 0 0 0 0 | CD2 , CD3 | |
| — | INF21 , INF31 | |
| — | INF22 , INF32 | |

FIG.12

| 7 | 6 | 5 | | 3 | 2 | | 0 |
|---|---|---|---|---|---|---|---|
| | P | | BSM1 | | BSM2 | | |
| | P | | BSM3 | | BSM4 | | |
| | P | | BSM5 | | BSM6 | | |
| | P | | 0 | | TV | F2 | F1 |

FIG.13

ON-BOARD SWITCHING CONTROLLER FOR A SATELLITE WITH ON-BOARD SWITCHING

FIELD OF THE INVENTION

The present invention concerns satellite control systems and more particularly it relates to an on-board switching controller for a satellite with on-board switching.

BACKGROUND OF THE INVENTION

In the latest developments of satellite communication systems, functions such as routing and switching are performed on board, so that the satellite is now an intelligent switching node, while the previously developed satellites operated only as passive repeaters.

In designing a satellite communication system to be simultaneously used for different types of services, such as telephony, speech band data and/or other modulated data, videoconference, television etc., problems arise which basically concern the choices of frame lengths, access type, transmission band, and so on.

SUMMARY OF THE INVENTION

Since at present satellite communication systems capable of attaining the goals mentioned above are not known, a system has been developed where on-board switching is carried out by a switching matrix with one space-switching stage, to avoid the use of on-board memories. This system uses access techniques of the type known as SS-TDMA (Satellite Switching-Time Division Multiple Access), with frames of 32 ms duration, so the to increase frame efficiency (as a ratio between useful and total data flow), and demand assignment (DA) of the channels to the master station with variable origin, destination and length to avoid time shifting and recompacting of the various emissions. The system also provides a wide range of services offered both on a switched basis (e.g. telephony) and on a permanent basis (e.g. television).

In order to control the on-board switching matrix, the present invention provides an on-board switching controller to be installed on-board the satellite. The on-board switching controller for a satellite with on-board switching is arranged essentially to control a base band switching matrix with one space switching stage and with a plurality of multiplexers. The matrix receives uplink frames and sends downlink frames dependent on switching states. The frames are subdivided into zones (T1 ... T6), of which the first and the last one comprise service channels, and the intermediate ones comprise traffic channels. The channels encompass certain number of states. A low-frequency bidirectional dialogue with a telecontrol and telemetering station (TLCS) also takes place via an uplink telecontrol and telemetering channel (TLC) and a downlink telemetering channel (TLM), each of the channels comprising a preamble and a data message. According to the invention, the controller (CNTR) directly receives from the switching matrix (BSM) and processes the service channels (CH, IOTS) of the uplink frames and directly supplies the matrix with the service channels (FMC, IOTD) of downlink frames, and receives via the telecontrol channel (TLC) and processes words for the control of its own operation and sends on the telemetering channel (TLM) replay words.

The controlling also has:

a preprocessing unit (PREL) selecting, synchronizing and decoding the service channels (CH, IOTS) of the uplink frames and extracting therefrom decoded data messages it sends to a first element (INC1) of first interface means (INC1, INC2);

a matrix interface unit (INTM), comprising two memory units (MEMA, MEMB) storing matrix switching stages, and first control means which determines the alternace of the memory units (MEMA, MEMB) as active and backup memory unit and which controls reading in the active memory unit of switching states to send to the matrix (BSM) and the updating of the switching states in both memory units (MEMA; MEMB);

a processing unit (ELAB) comprising: a second element (INC2) of said first interface means, which means also checks the existence and correctness of the dialogue with said preprocessing unit (PREL), and checks the veridicity of received data messages; second interface means (INTB) for receiving, decoding and checking data messages supplied by the telecontrol channel, and for transmitting the telemetering channel; and first means (GMS, GTLC) for decoding and executing the commands present in the data messages received from the first and second interface means (INC1, INC2; INTB), the first decoding and executing means managing, on the basis of said commands, a normal operation mode of the controller, in which all functions are activated, and a degraded operation mode, in which said preprocessing unit (PREL) and said first interface means are disabled, and controlling the writing of the switching states, contained in said data messages, into the backup memory unit only or in both memory units (MEMA, MEMB) at locations reproducing the frame subdivision into channels and zones.

BRIEF DESCRIPTION OF THE DRAWING

The above and other objects, features and advantages of my invention will become more readily apparent from the following description, reference being made to the accompanying highly diagrammatic drawing in which:

FIGS. 1k1, 12, 13 show the subdivisions into data fields of data words contained in unit ELAB or in memories MEMA, MEMB;

SPECIFIC DESCRIPTION

Figure 1:
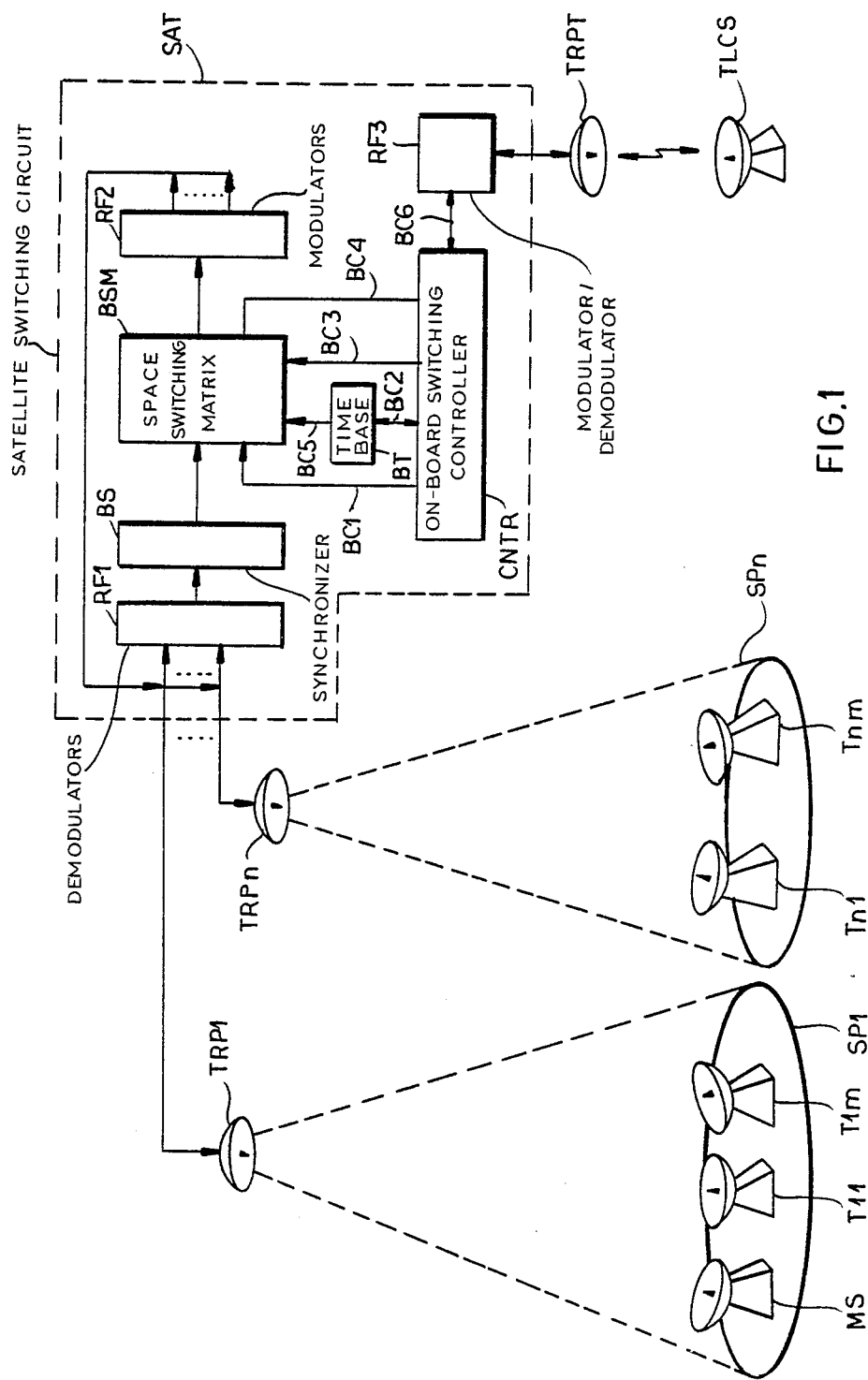
FIG. 1 is a diagram of a satellite communication system partly in block form and partly in pictorial form.

In FIG. 1 dotted-line block SAT is a block diagram of the whole switching circuitry on-board the satellite. SAT comprises blocks RF1, RF2; RF3, BS, BSM, CNTR, BT.

RF1 denotes a block comprising n demodulators of known type for the radiofrequency signals coming frame transponders TRP1 . . . TRPn, also of known type.

BS denotes a block of known type which synchronizes the bit flows arriving from RF1 with a bit synchronism signal supplied by block BT.

BSM denotes a known single-stage space switching matrix. BSM, on the basis of control signals present on bus BC3 and supplied by block CNTR, combines the bit flows coming from BS with those present on buses BC1, BC5 and, after switching, sends them to block RF2. A portion of the flow arriving from BS is switched from BSM onto bus BC4 which is duplicated for reliability purposes.

Block RF2 comprises n modulators producing a corresponding number of modulated signals to be sent to transponders TRP1 . . . TRPn.

BT denotes a time base generating the synchronism signals for the satellite circuits and synchronism words to be sent to earth. BT exchanges signals with block CNTR through bus BC2 and sends the synchronism signals to matrix BSM through bus BC5, onto which it also sends a synchronism channel switched by BSM towards earth. The connections of BT with BS and the other satellite circuits are not shown in the drawing for the sake of simplicity.

RF3 denotes a block of known structure which comprises a modulator and a demodulator for transmission and reception of two channels, through a further transponder TRPT with lower carrier frequency, to and from a telecontrol and telemetering station TLCS which transmits towards and receives from transponder TRPT via lowfrequency channels, hereinafter referred to as uplink telecontrol channel TLC and downlink telemetering channel TLM.

CNTR denotes the on-board switching controller according to the invention. CNTR exchanges with matrix BSM switching control signals and communication channels through buses BC1, BC3, BC4; it also exchanges synchronism signals with time base BT through bus BC2 and communicates bidirectionally with block RF3 via bus BC6 conveying channels TLC, TLM. The structure of the signals present on buses BC1 . . . BC4, BC6 will be examined in detail hereinafter. SP1 . . . SPn denote n terrestrial zones covered by corresponding transponders TRP1 . . . TRPn. Each zone comprises a number of transmitting - receiving stations: T11 . . . T1m in zone SP1; Tn1 . . . Tnm in zone SPN.

The satellite communication system requires a master control station MS for system control form earth; such a station is located in one of the zones, e.g. zone SP1. The transmission system is of the multi-beam regenerative type, with SS-TDMA access techniques, and demand assignment of the channels with variable origin, destination, window. The offered services are on switched and/or semipermanent basis and comprise: telephony, speech band data, other modulated data, videoconference, television. Traffic from and towards stations MS, T11 . . . Tnm is subdivided into frames which in the example described hereinbelow, last for 32 ms.

Figure 2:
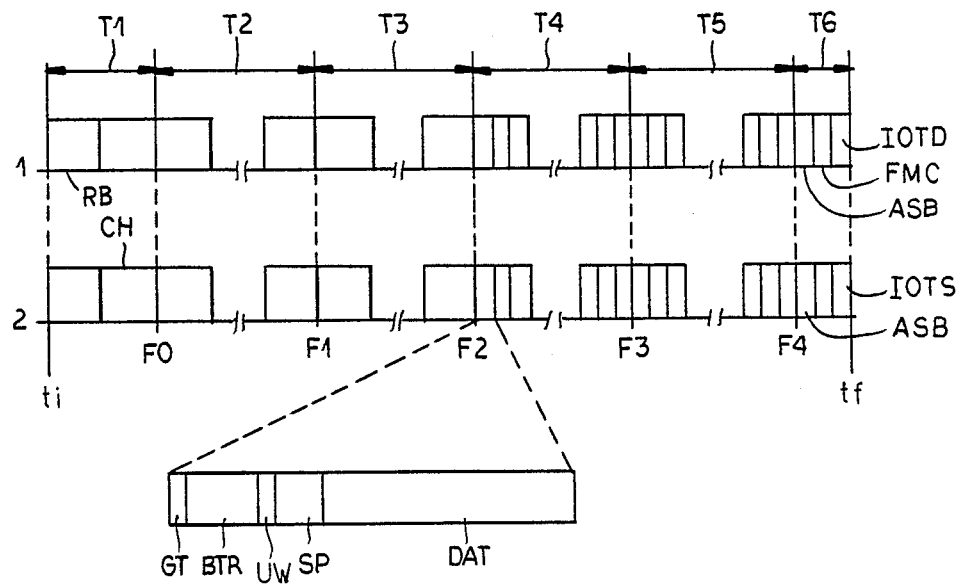
FIG. 2 represents the type of frame chosen.

FIG. 2 shows downlink frames 1 (from the satellite towards earth) and uplink frames 2 (from earth to the satellite).

The frames are subdivided into zones T1, T2, T3, T4, T5, T6. Each zone is subdivided into modules, of a first type for zones T1, T2, T3, and of a second type for T4, T5, T6. The first type modules have a length equal to 3 times that of second type modules. All modules have the same structures. The Figure shows on enlarged scale the structure of a module, e.g. of the second type; it comprises the following fields:

GT: guard interval bits
BTR: demodulator synchronism recovery bits
UW: identification word bits
SP: service channel bits
DAT: data bits.

Fields BT, BTR, UW, SP form the preamble and have the same length in al modules; data field DAT has a length which in the first type modules is 4 times that of the second type modules.

The various zones are organized as described hereinafter. T1 and T6 are service service zones, while T2, T3, T4, T5 are traffic zones.

Zone T1 (first service zone):

in downlink frames 1, a first module carries frame synchronisation channel RB, generated by on-board time base BT (FIG. 1) and broadcast to all transponders at the same time; the following module (shaded in the drawing) is not used;

in uplink frames 2, a first module (dashed in the drawing) is not used; a second module carries channel CH sent from master station MS (FIG. 1) and containing on-board switching plan and further control information for the interconnection between MS and onboard controller CNTR.

Zone T6 (second service zone):

in downlink frames 1, a first module carries channel ASB (Acquisition and Synchronization Burst); a second module carries channel FMC which is the the return of channel CH for the interconnection between on-board controller CNTR (FIG. 1) and master station MS; a third module carries channel IOTD for transmission by the on-board controller of bit patterns for tests at earth;

in uplink frames 2, a first module carries channel ASB; a second module (dashed in the drawing) is not used; a third module carries a channel IOTS whose characteristics are the same as those of its homologous IOTD of downlink frames (channels IOTD, IOTS are in the same time position to allow the channels to be closed in a loop and to enable execution of tests on board and among stations).

Zone T2: is a zone allotted to semi-permanent connections and comprises semi-permanent telephone; data and videoconference channels.

Zone T3: is a zone devoted to switched video-conference (gathering technique).

Zone T4: is a switching zone comprising telephony and data channels.

Zone T5: is a zone devoted to station synchronisation and telephone signalling.

Points F0, F1, F2, F3, F4, hereinafter names borders, separate the various zones. All borders have at any instant the same time position in all transponders. The positions of borders F1, F2, F3 can vary within determined limits upon a command from earth, even though their order remains unchanged, while borders F0 and F4 are fixed. One or two of zones T2, T3, T4 can be missing. In case of a TV connection between two transponders, owing to the broad band demanded, all other channels, with the only exception of those of service zones T1, T6, are released to leave free space for this connection in the frame.

Transmission from and to station TLCS (FIG. 1) is a point-to-point transmission with low carrier frequencies, and comprises telecontrol and telemetering channels TLC, TLM, a reset signal for controller CNTR and a freezing signal of the addressing memories of matrix BSM. In an example described herein the following numerical values are chosen:

maximum number of stations m=32 per transponder;
n=6 transponders covering an equal number of earth zones;
transmission frequency: 20 and 30 GHz;
frame length: 32 ms;
in the frame, field DAT has a length of 2048 symbols for the first types modules and 512 symbols for the second type modules; the preamble is 256-symbol long is all modules.

For channels IOTD, IOTS, FMC, CH the preamble field length is as follows:
telemetering channel: synchronous at 16 bit/s
telecontrol channel: synchronous at 48 bit/s.

Figure 3:
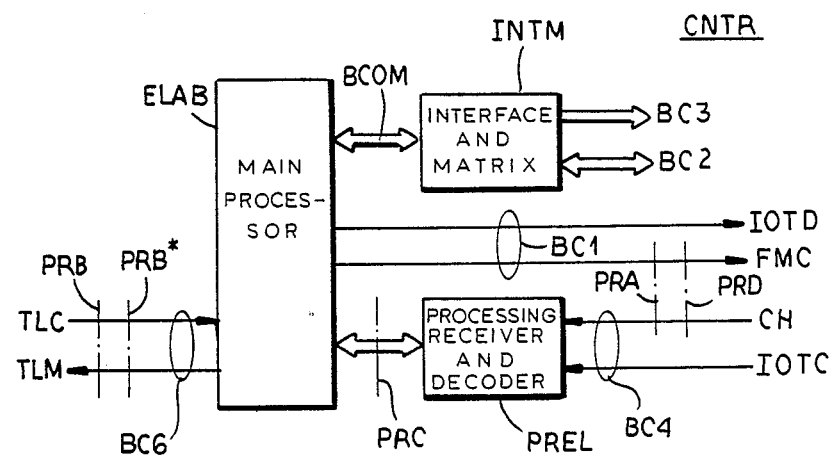
FIG. 3 is a functional block diagram of the on-board controller according to the invention.

The structure of controller CNTR is shown in greater detail in FIG. 3, which shows its subdivision into three main functional blocks.

PREL denotes a preprocessing unit which receives and decodes the information present on uplink channels CH and IOTS received via bus BC4 from matrix BSM (FIG. 1). Channel CH is coded according to a higher-level protocol PRD and a lower-level protocol PRA. PREL sends the messages relevant to coded channels to unit ELAB from which it receives the commands. Two-way dialogue with ELAB takes place according to a transmission protocol denoted by PRC. Unit PREL will be analyzed in greater detail with reference to FIG. 7.

ELAB denotes a main processing unit performing the following functions: handling of telecontrol and telemetering channels TLC, TLM; management of the information sent to the master station, through generation of downlink channels FMC and IOTD; handling of the information coming from the master station, through dialogue with unit PREL; control of the operation of units INTM and PREL. ELAB sends onto bus BC1 channels FMC and IOTD which are switched by matrix BSM (FIG. 1) and sent towards earth. Channel FCM is coded according to protocols PRD and PRA, like channel CH. Via bus BC6 ELAB receives channel TLC and sends channel TLM towards block RF3 (FIG. 1). These channels are coded according to a protocol PRB under normal operation conditions, or a protocol PRB* under degraded operation conditions. ELAB dialogues bidirectionally with units PREL and INTM. Block ELAB will be analyzed in greater detail with reference to FIGS. 8 and 10.

INTM denotes an interface with matrix BSM (FIG. 1) and contains memories of the matrix commands, or switching states. INTM receives from ELAB commands, addresses and data for memory writing/reading operations and replies with some signals to ELAB, through bus BCOM. It also receives synchronism signals from time-base BT (FIG. 1), sends commands to BT for reading/writing operations via bus BC2 and sends the states read to matrix BSM through bus BC3.

The structure of INTM will be described in detail with reference to FIG. 15.

CNTR has two operation modes: normal and degraded mode. During normal operation the controller can dialogue with earth towards the master station MS through messages on channels CH, FMC, coded according to protocols PRD and PRA, and towards the telecontrol station TLCS through messages on channels TLM and TLC, coded according to protocol PRB.

The following kinds of messages are exchanged on channels CH, FMC under normal operation conditions:
information messages, concerning the updating of the controller memories storing the switching states of matrix BSM;
control and acknowledgment messages concerning the updating of on-board states and procedures; and
state messages and state request messages, concerning the request of acknowledging at earth on-board states and switching states stored in the controller memories.

The following kinds of messages are exchanged on channels TLC, TLM:
command and acknowledgment messages concerning controller operation and service state updating; and
state messages and state request messages;
alarm messages, concerning anomalous controller conditions.

During degraded operation the controller dialogues with earth only through messages on channels TLC, TLM coded according to protocol PRB*, while channels CH, FMC are released and unit PREL is inhibited. In degraded operation messages of the following types are exchanged on channels TLC, TLM:
information messages;
state messages and state request messages; and alarm messages.

The switching from normal to degraded operation and vice versa is driven by telecontrol station TLCS.

Protocols PRD, PRA, PRB, PRB* according to which messages on channels CH, FMC, TLC, TLM are coded will be now described.

Figure 4:
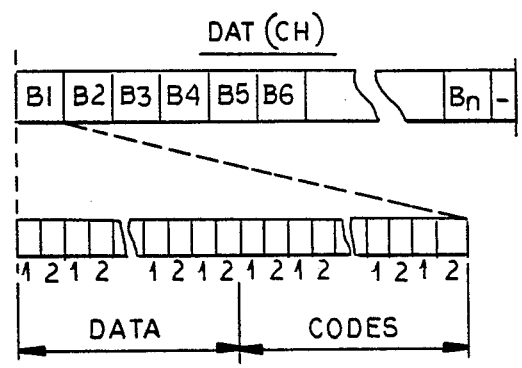
FIGS. 4, 5, 6 show data and message structure in channel CH.

As to uplink protocol PRD (earth-satellite direction), field DAT of channel CH is coded as follows (FIG. 4). Field DAT is subdivided into blocks B1 ... Bn, each comprising 48 bits, up to a maximum of n=42 blocks, the last 32 bits being unused (2.048 bits at the most). Each block contains interleaved bits of two data strings encoded in Golay code: 12 data bits D, plus the code bit C per every string (in the Figure sequence 1, 2 ... indicates the bits of the first and second string e.g. of block B1). Last block Bn contains the interleaved bits encoded in CRC (cyclic redundancy code) code, of known type, of the whole original sequence of data strings to be sent onto channel CH. More particularly in master station MS the sequence of data strings to be transmitted on channel CH during a given frame is encoded according to CRC code, thus obtaining two further data strings which then undergo a further encoding in Golay code and interleaving like block sB1 ... Bn−1, thus obtaining a further block Bn.

With the numerical values chosen for the example described here, the CRC code comprises 16 original bits which can be extended to 24 (by adding 8 stuffing bits) to obtain two 12-bit data strings. In case of lack of data to be transmitted, two blocks will be present on channel CH: the first containing zero value, the second the CRC coding of such a value, in order to monitor channel activity.

That protocol is designed to render very low the probability for an erroneous message to reach processor ELAB and for a reply of the latter to be found erroneous on earth. Data coding by Golay code (of the perfect cyclic type) allows correction of up to three erroneous bits in each coded word. Besides, if differential demodulators are used in RF1 (FIG. 1), an error on the channel affects two subsequent demodulated symbols; then the interleaving of two data strings avoids the drawback of having two erroneous symbols per each channel error on the same string.

Downlink protocol (satellite-earth direction) comprises the coding procedure of data to be transmitted on channel FMC. These data are already encoded according to protocol PRA, which will be explained hereinafter, and are organized into blocks with a variable number of 16-bit words. Coding according to downlink protocol PRD consists in triplicating some of these blocks, leaving others blocks unchanged. While examining protocol PRA, the triplicated word blocks will be pointed out.

Message format of protocols PRA, PRB, PRB* is the same, and comprises uplink messages as commands, and downlink messages as replies.

Figure 5:
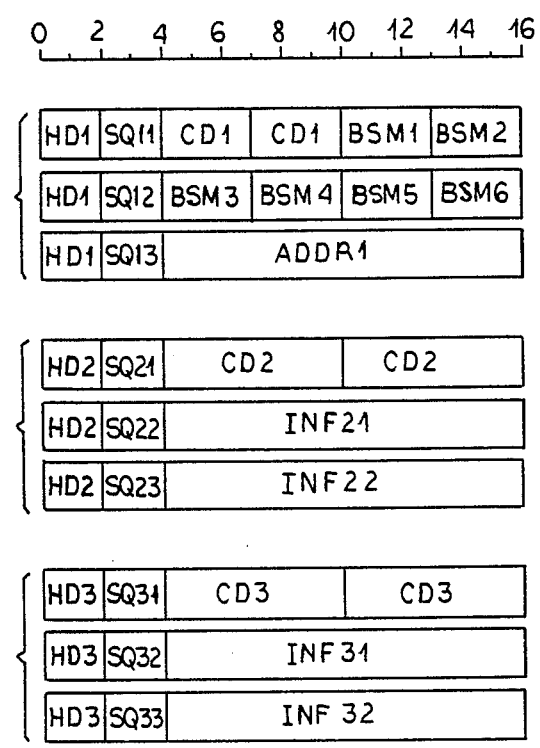

FIG. 5 shows the uplink message format. The messages have a fixed length of three 16-bit words; each word starts with a 2-bit heading code-field HD1, HD2, HD3, specifying the message type, followed by a word-sequence numbering field SQ11 ... SQ33 of two bits which numbers the words of a message. Uplink messages are of three types:

information messages ULW1: they contain information (states) to be written into addressing memories of matrix BSM (FIG. 1), which are contained in INTM (FIG. 3) and are denoted hereinafter by MEMA, MEMB; fields BSM1 ... BSM6 of the first two words contain states of an equal number of multiplexers (or demodulators) of BSM; field ADDR1 of the third word contain the addresses where states are to be written into memories MEMA, MEMB; duplicated code field CD1 specifies which of frame zones T2 ... T5 the states are referred to. Information messages ULW1 do not require downlink reply messages;

command messages ULW2: they request procedure activation and onboard state updating or concern processor or preprocessor operation; the command type is identified by duplicated code field CD2 of the first word, while fields INF21, INF22 of the second and third words contain information available for the controller. Command messages ULW2 require reply messages as acknowledgment of command execution; and state request messages ULW3: they request reading and forwarding to earth, for acknowledgment purposes, of determined on-board states, specified in duplicated code CD3 of the first word; fields INF31, INF32 of the second and third word contain information available for the controller.

Figure 6:
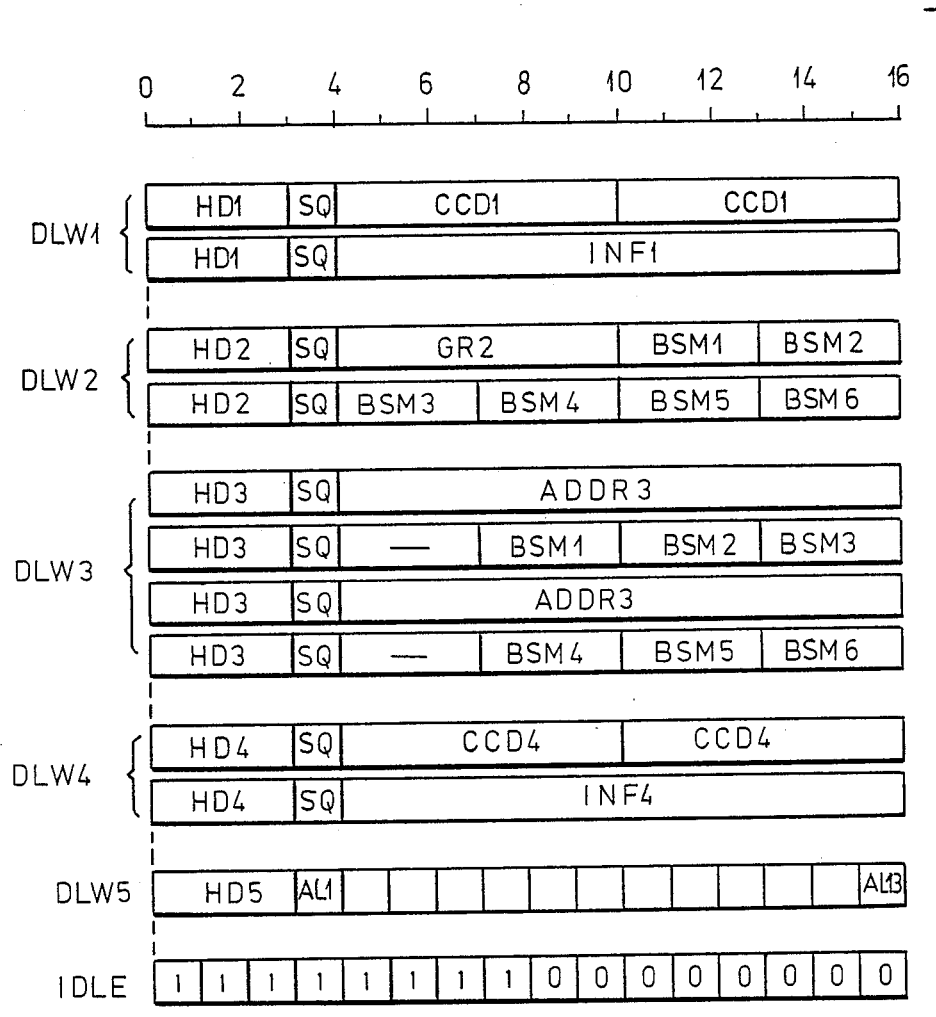

FIG. 6 shows the downlink message format. Downlink messages have a length varying from 1 to 32 16-bit words; even in said messages each word starts with a 3-bit heading code-field HD1 ... HD5 specifying the message type, followed by a word-sequence numbering field SQ consisting of one bit for numbering word pairs. Downlink messages are of the following types:

acknowledgment messages DLW1: they are reply messages relevant to uplink command messages and acknowledge command execution; they comprise two words, in the first of which duplicated code field CCD1 identifies the type of acknowledgment, while field INF1 in the second word carries supplementary information; and state messages DLW2, DLW3, DLW4: they are reply messages to state request messages ULW3 and are subdivided into the following types:

(a) state messages relevant to frame zone T2 allotted to semi-permanent telephone connections: they acknowledge to earth one 16-state block of the area allotted to semi-permanent telephone connections in the addressing memories of matrix BSM; they have a length of 16 pairs of words DLW2; each word pair carries field GR2 specifying the number identifying the acknowledged 16-state block (the zone allotted to semi-permanent telephone connections has a maximum extension in the frame corresponding to 64 16-state blocks), followed by fields BSM1 ... BSM6 relevant to the states of the 6 demodulators of matrix BSM. The number of said state messages (up to 64) depends on the request;

(b) state messages relevant to frame zone T3 dedicated to videoconferences: they acknowledge to earth one block of the area allotted memories of matrix BSM; they have a length of one pair only of words DLW2, since each block concerns a single videoconference, as disclosed above, with a same state of the 6 demodulators of BSM; field GR2 specifies the block (whose maximum number is 16). The number of said state messages (up to a maximum of 16) depends on the request;

(c) state messages DLW3 relevant to frame zones T1, T5, T6: they acknowledge to earth the state of matrix BSM relevant to one modules of said zones; they have a fixed 4 word-length: duplicated field ADDR in the first and third words contains the address of the area where the states of the 6 demodulators of BSM are written in the addressing memories of matrix BSM, said states being contained in fields BSM1 ... BSM6 of the second and fourth words;

(d) on-board state messages DLW4: they acknowledge to earth certain processor or preprocessor states and have a fixed 2-word length; duplicated code field CCD4 in the first word identifies the message type, while information field INF4 in the second word specifies the requested state;

alarm message DLW5: it comprises one word where field SQ is not present; it sends information on anomalous controller operation states to earth; the active state of each 1-bit field AL1 ... AL13 indicates an alarm due to a specific malfunction, as it will be examined also hereinafter; and message IDLE: it comprises one word, with a fixed configuration of 8-bit at logic 1 and is sent, in the absence of other messages, for stuffing purposes and monitoring of the activity of channels TLM and FMC.

The repertory of messages relevant to protocols PRA, PRB, PRB* will be now examined in detail.

Protocol PRA

Information messages ULW1 (FIG. 5): as already seen, each of said messages allows updating the state of the demodulators of matrix BSM relevant to a frame position specified by code field CD1 (identifying the zone) and address field ADDR1. The code field has the following zones:

A01: zone T2, semi-permanent telephone connections;

A02: zone T3, when such zone is allotted to semi-permanent videoconference connections;

A03: zone T3, when such zone is alloted to switched videoconferences;
A04: zone T4, telephone switchings;
A05: zone T5, telephone signalling, synchronisms;
A06: zone T6, channel IOTS; and
A07: zone T6, channel ASB.

No acknowledgment of the information messages is sent to earth through downlink messages.

Command messages ULW2 (FIG. 5) and corresponding acknowledgment messages DLW1 (FIG. 6); the commands are as follows:
A11: change frame border F1;
A12: change frame border F2;
A13: change frame border F3;
A14: actuation of a TV connection, 1st command;
A15: actuation of a tV connection, 2nd command;
A16: change of end point of a TV connection in the frame, 3rd command; and
A17: exchange between active and backup memory.

In messages A11, A12, A13 the information field carries the new border value. Messages A14, A15, A16 are generally sent together and their information field contains information relevant respectively to the identifies of uplink and downlink transponder involved in the connection, and to the point of each frame where TV information ends.

Each of the commands A11 to A17 is acknowledged to earth by an acknowledgment message. The acknowledgment messages CLW1 are triplicated by downlink protocol PRD.

State request messages ULW3 and corresponding state messages DLW2, DLW3, DLW4; the state requests are as follows;
A21, A22, A23: request of state blocks, present in memories MEMA, MEMB, of frame zones T2, T3, T5, T6;
A24, A25, A26: request of the values of borders F1,F2,F3, respectively;
A27, A28, A29: request of identity of the uplink transponder, of the downlink transponder, and of the TV connection end point in the frame, concerning a television connection; and
A210: active memory identity request.

State requests A21, A22, A234 are acknowledged with the already mentioned state messages (a), (b), (c), respectively; the other requests A24 . . . A210 are acknowledged with message (d). State messages (c), (d) of DLW3, DLW4 type are then triplicated by downlink protocol PRD.

Protocol PRB

Command messages ULW2 and corresponding acknowledgment messages DLW1. The commands can be intended for the processor or the preprocessor. The processor commands can be of the following types:
B11, B12: enabling and disabling of parity check in memories MEMA, MEMB;
B13, B14, B15: enabling of checks (a), (b), (c) (described later on) on the dialogue between processor and preprocessor;
B16, B17, B18: disabling of the above checks;
B19, B110: enabling of the exchange between active and backup memories, every frame or every superframe;
B111: actuation of matrix demodulator redundancy function;
B112: exchange from normal to degraded operation.

The commands for the preprocessor are commands C1 . . . C9 which will be examined with reference to protocol PRC. The disabling commands do not require downlink acknowledgment messages. Among the commands intended for the preprocessor, only those comprising counter state requests give origin to acknowledgment messages, containing the requested states in the information field. Enabling commands for the processor require a corresponding acknowledgment message.

State request messages ULW3 and corresponding state messages DLW4 (d): code field CD3 of ULW3 identifies the following types of requests of on-board states:
B21: request of demodulator redundancy state;
B22: request of active memory identity;
B23: request of state of memory exchange enabling every frame or superframe; and
B24: request of command state word to a the preprocessor.

Each state request is replied to with a state message.
Alarm messages DLW5: fields AL1 . . . AL13 of DLW5 can signal the following anomalous conditions:
AL1, AL2, AL3, AL4: overflow of counters CNK, CNQ, CNR, CNS in block PREL (FIG. 3). These alarms are carried by the sixth word of the reply message of protocol PRC and come from the preprocessor.
AL5, AL6, AL7: alarms generated by checks (a), (b), (c) on processor/preprocessor dialogue. These checks are enabled by command messages B13, B14, B15;
AL8: information message of uplink protocol PRA outside the borders;
AL9: erroneous message on uplink channel TLC;
AL10, AL11: parity error in memories MEMA, MEMB;
AL12: inconsistency of borders F1, F2, F3;
AL13: borders F1, F2, F3 out of limits.

Said alarm conditions will be better analyzed in the description of block ELAB.

Message IDLE already examined.

Protocol PRB*

Information messages ULW1: they replace those of protocol PRA and are of the following types:
B31 . . . B35: they are alike messages A01, A02, A05, A06, A07 of
protocol PRA; messages A03, A04 relevant to frame zones T3, T4 are lacking since the low rate of channel TLC would not allow the quick state variations in said zones to be followed;
B36, B37: allotment of channels CH, FMC to a backup master
station (commands absent in protocol PRA).

Command messages ULW2 and corresponding acknowledgment messages
DLW1: they replace those of both protocols PRA, PRB; now the commands relevant to the preprocessor are lacking, since it is deactivated; the command types are as follow:
B41 . . . B47: see commands A11 . . . A17 in protocol PRA;
B48, B49: see commands B11, B12 in protocol PRB;
B410, B411: see commands B19, B110 in protocol PRB;
B412: see command B111 in protocol PRB;
B413: exchange from normal to degraded operation: dual of command B112 of protocol PRB.

The messages acknowledging command execution are already examined for protocols PRA, PRB.

State request messages ULW3 and corresponding state messages: they replace those of protocols PRA, PRB. State requests are as follows:

B51...B510: see requests A21...A210 of protocol PRA;

B511, B512, B513: see requests B21, B22, B23 of protocol PRB;

B514, B515: depending on commands B37, B38, request of the new states of the multiplexers corresponding to channels CH, FMC.

The state messages have already been examined with reference to protocols PRA, PRB.

Alarm messages DLW5: they are those of protocol PRB which do not concern the preprocessor, i.e. those of fields AL9...A13. Besides field AL8 indicates now that an information message of protocol PRB* is outside the border.

Message IDLE, already examined.

Units PREL and ELAB have been implemented with microprocessor structures, which will be described with reference to FIGS. 20 and 21.

The operations carried out by unit PREL are hereinbelow described with reference to the functional diagram of FIG. 7.

MX1 denotes a block carrying out a selection operation on the basis of commands COM1 and allowing at each frame the input of channels IOTS, CH (of uplink frames) present on bus BC4 and switched through matrix BSM (FIG. 1): block MX1 is necessary since bus BC4 is duplicated, as seen in FIG. 1.

References SIOT and SCH denote two blocks able to respectively synchronize channels IOTS and CH received from block MX1 on the basis of commands COM1, COM2. Synchronization consists in looking for synchronise word UW (FIG. 2) in the preamble inside the channel received and is necessary owing to the slight instability of the satellite orbit with respect to a stationary condition: such instability generates a Doppler effect in the signal received on-board the satellite and hence an uncertainty in the location of the individual channels, with respect to the theoretical condition. According to computations made, the uncertainty is, in probilistic terms, about one symbol every 80 frames.

Synchronism word UW is sought within a window a 64 symbols (32 of UW, 16 on the right and 16 on the left) with the following procedure. In a free search phase, carried out e. g. at the first frame to synchronize, word UW is sought with 32 subsequent search steps which analyze the whole window from one end to the other. At each search step the set of 32 symbols taken into account is compared with a stored 32-symbol configuration corresponding to word UW. The equality condition means that the synchronism word has been detected. If word UW is not detected or is detected more than once, the corresponding channel is considered non-synchronized, and hence the information it carries is lost; in this case a counter of failed synchronization, provided in SCH (counter CNS) or in SIOT (counter CNS), is advanced by one step, and in the subsequent frame all free search steps will be repeated. If word UW is detected once, synchronisation has taken place and the position of UW in the window is stored; in the subsequent frames, the presence of UW in the memorized position is checked, and the free search will be resumed only in case of negative check.

Based on commands COM1, COM2, the content of counters CNQ, CNS can be supplied to block UCP1, which also receives the possible overflow signals of said counters are alarms, as will also be seen hereinafter.

VIOT denotes a block carrying out at each frame a check on field DAT of channel IOTS coming from SIOT, only if synchronization has taken place. The check on channel IOTS is carried out by comparison with a predetermined bit pattern stored in VIOT. At each frame an internal counter, hereinafter denoted CNK, is advanced by the number of discrepancies found out; the content of CNK can be supplied to block UCP1, which also receives the possible overflow signal of said counter as alarm.

DECH denotes a block which decodes field DAT of channel CH, it receives from SCH, only if synchronization has taken place. DECH carries out the inverse operations of those of protocol PRD for uplinks frames. For each block Bi (FIG. 4), DECH carries out the operation opposite to interleaving by reconstructing the two original words coded in Golay code, which are then stored in ancillary registers. Hence DECH decodes each word according to Golary code, by using a decoding scheme as described in European Patent Application No. 84111-18.2, published on 24. 04. 1985 under No. 138078 and filed in the name of CSELT. By the decoding, DECH obtains two data words for each of blocks B1 to B(n−1) in field DAT in CH, and the CRC coding of said words in block Bn. Then DECH further decodes the data words according to CRC coding, by a known procedure.

If errors are detected in the latter decoding process, the whole field DAT is cleared and the relevant information is lost; besides, an error counter, indicated hereinbelow by CNR, is incremented by the number of errors found out. Upon command COM2, DECH supplies block UCP1 with the contents of counter CNR, and even with the possible overflow signal as alarm. If no error has been found out, the decoded words are supplied to block UCP1.

Figure 8:
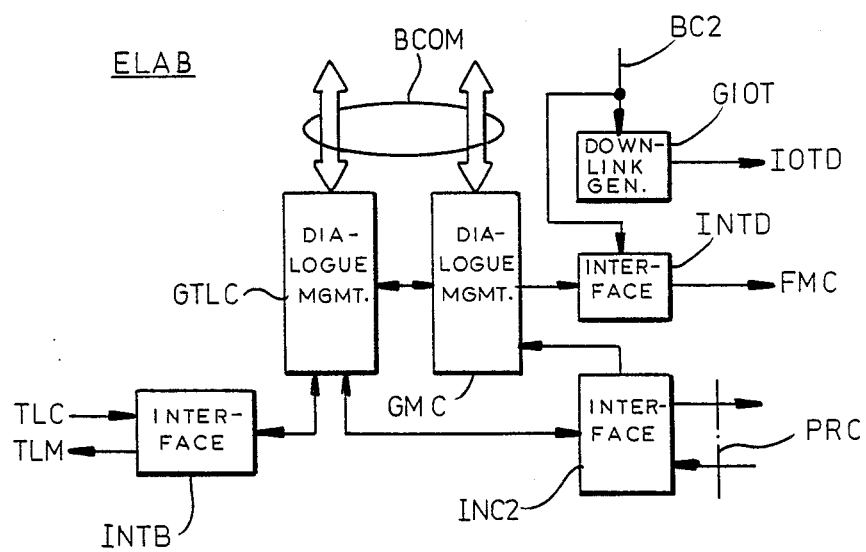
FIG. 8 is a functional block diagram of unit ELAB of FIG. 3.

INC1 denotes an interface for managing the dialogue between preprocessor PREL and processor ELAB, which comprises a corresponding interface (INC2, FIG. 8). Protocol PRC according to which said dialogue takes place is hereinbelow described. The dialogue comprises command messages sent from ELAB and reply messages sent by PREL.

Command Messages: supply the preprocessor with the operation modalities given from earth through telecontrol channel TLC. They are messages enabling/disabling the preprocessor operations or requiring some preprocessor operation states. Every command and the positions of the individual bits identify the various preprocessor operation modalities; the state word is written into INC1 at frame frequency, while its variation (with correspondent command variation) can take place at superframe frequency (about 8 seconds). Inside the state word, the meaning of the individual bits is as follows:

1st bit: selection of the outputs of the demodulators of matrix BSM (FIG. 1): since bus BC4 is duplicated, the logic level of this bit selects, through multiplexer MX1 (FIG. 3), the bus which, in the bus pair forming BC4, conveys channels CH and IOT to the preprocessor.

2nd bit: enabling of the input of channels CH and IOT; also this bit is carried as control bit to multiplexer MX1 for channel input.

3rd and 4th bits: spare bits.

5th bit: request of the state of counters CNR, CNS;

6th bit: request of the state of counters CNK, CNQ;
7th bit: enabling of check of channels IOT (block VIOT);
8th bit: enabling of decoding of channel CH (block DECH).

The active level of the 5th to 8th bits enables the operation already described of blocks SIOT, VIOT, SCH, DECH. The possible combinations of active levels of the state word bits give origin to the following command messages:

C1: enabling procedure of channel CH
C2: C1+request of states of counters CNR, CNS
C3: enabling procedure of channel IOT
C4: C3+request of states of counters CNK, CNQ
C5: enabling procedures of channels IOT and CH
C6: C5+request of states of counters CNR, CNS
C7: C5+request of states of counters CNK, CNQ
C8: C5+request of states of all counters
C9: preprocessor disabling.

Reply messages: each command message is replied to by a reply message supplied during the frame time and having a variable length depending on the command message type. Each reply message consists of the following sequence of 16-bit words:

4 words containing fixed bit configurations;

1 word containing the command message state word as acknowledgment, and the number of words in protocol PRA contained in field DAT of channel CH, which words are decoded by DECH and are to be transferred to the processor;

1 word containing the bits indicating the possible overflow of counters CNR, CNS, CNK, CNQ, and the number of words forming the preprocessor messages replying to state requests in command messages;

N words ($0 \leq N \leq 60$) which are the words in protocol PRA decoded by DECH, and which convey fixed-length messages of 3 words each and have a structure which is shown in FIG. 5 and will be examined hereinbelow;

M words ($0 \leq M \leq 8$) forming the replies to the state requests in command messages C2, C4, C6, C7, C8; each reply has a length equal to two words DLW4 (FIG. 6), which will be disclosed hereinafter; here it will be enough to mention that field INF4 of the second word DLW4 contains the demanded counter value or state.

The words of protocol PRA, or the replies to state requests, can be lacking depending on the command message type. If the latter does not require explicit replies (see types C1, C3, C5, C9), and if there are no words in protocol PRA, the preprocessor will send anyway a reply message for activity monitoring purposes, consisting of the first 6 words where the counters of the fifth and sixth word are zero.

The functions of preprocessor interface INC1 and of the processor interface will be jointly analyzed hereinbelow.

UPC1 denotes a unit controlling preprocessor operation. UCP1 receives and decodes command messages C1 ... C9, executes the relevant commands by activating involved blocks MX1, SIOT, VIOT, SCH, DECH; it receives from these blocks the corresponding replies, combines them into the just examined reply messages in protocol PRC, it sends through INC1 to the processor. More particularly UCP1 sets also the counters of the number of words in the reply messages and of protocol PRA, and sends the contents of said counters to the processor through the fifth and sixth word of the message in protocol PRC, as already seen.

The above described functions of unit PREL are implemented through a stored microprogram comprising a single application module, which is started at each frame by an interrupt signal supplied by ELAB and executes a subroutine sequence implementing the individual functions described in FIG. 5. At the end of the operations carried out at each frame, PREL supplies the processor with an interrupt signal starting the preprocessor/processor dialogue procedure for supplying the processor with reply messages; this procedure will be disclosed in detail hereinbelow. Starting from the functional description above the skilled worker in the art can implement the application microprogram which can be written e.g. in ASM/86 language.

The operations carried out by block ELAB are described hereinbelow with reference to the functional diagram of FIG. 8.

INC2 denotes the interface that in ELAB manages the dialogue with the preprocessor. INC2 must essentially check the regularity of the dialogue between PREL and ELAB, while interface INC1 in PREL must temporarily store the messages to be exchanged. As will be seen later, there is provided a register in which the processor writes at each frame the state word according to protocol PRC, and a register, with 1-word capacity, for the exchange of the reply messages always in protocol PRC. In addition a 1-position condition register is provided.

Three types of checks are carried out by interface INC2; these checks are possibly enabled by command messages B13, B14, B15 sent in protocol PRB on channel TLC, and hence they can only be carried out in normal operation. In particular:

type (a): check of dialogue existence. Whenever a state word is written into the register of INC1, i.e. at each frame, INC2 sets to "1" the condition register. In case of a reply by the preprocessor, INC2 resets said register to "0"; before each writing, INC2 checks whether the condition register is "0": if it is not, INC2 signals an alarm by setting field AL5 in the alarm message of protocol PRB to "1";

type (b): reply check. Taking into account the reply message format already described, INC2, upon receiving the first 4 words with fixed-bit configurations, checks their correctness: in case of discrepancy it signals an alarm by setting field AL6 of the alarm message of protocol PRB to "1"; and type (c): command check. Upon receiving the fifth word in the reply message, INC2 compares the command message written there by PREL with that sent to INC1: in case of discrepancy, it signals an alarm by setting field AL7 in the alarm message of protocol PRB to "1".

If the just examined checks have found no anomalies, INC2 sends the fifth word of the reply message in protocol PRC and the consequent words in protocol PRA to block BMS, and sends the sixth word and the M words of protocol PRC forming the message replying to state requests to block GTLC.

GMS indicates a functional block having mainly to manage the dialogue of the controller with master station MS (FIG. 1) through uplink channel CH and downlink channel FMC. Data from and towards MS are organized in GMS according to protocol PRA. GMS is active only during the normal controller operation, as is preprocessor PREL. GMS receives via channel CH, handled by preprocessor PREL, information, command and state request messages supplied (in protocol PRA) by interface INC2. GMS first checks and decodes the messages received. The checks carried out are as follows:

GMS checks that, in each message, field HD1, or HD2, or HD3 is the same for the three words forming the message, and that fields SQ11 ... SQ33 carry the right numerical sequence;

GMS checks in each message the equality of the two fields in CD1, or CD2, or CD3, and besides checks that the code carried by said fields belongs to a list of permitted codes present in an internal memory area. In case of negative check, the message is ignored and GMS generates an alarm signalling BY setting field AL8 in the alarm message to "1".

Depending on the messages received, GMS consequently manages the addressing memories in matrix BSM, executes commands, carries out on-board checks and signals alarms. Each of these functions will be now analyzed in detail.

(1) Management of addressing memories MEMA, MEMB of matrix BSM.

Figure 9A:
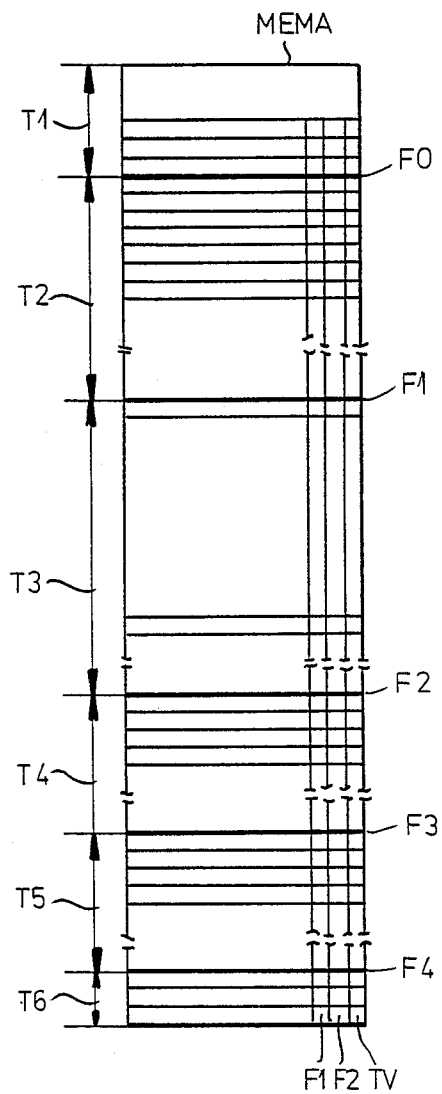
FIG. 9 shows, at a first detail level, the data allocation in memories MEMA, MEMB contained in block INTM of FIG. 3.
Figure 9B:
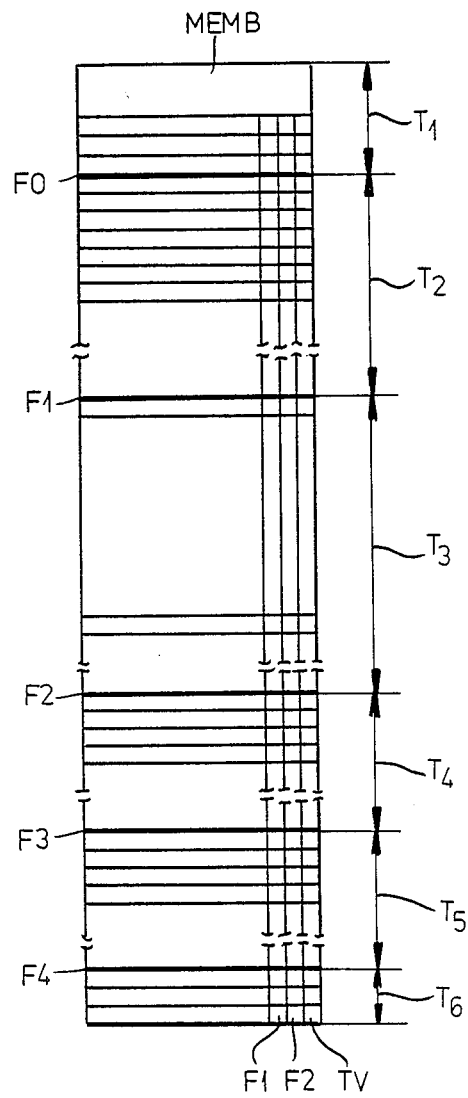

At each frame one of the two memories is active (i.e. it supplies BSM with switching states) and the other is in backup condition, and their functions can be exchanged every frame or superframe, through a suitable control signal. First, GMS writes into the memories through bus BT1 the states of the demodulator of BSM, with the following modalities, described with reference to FIG. 9, showing the data allocation in the memories. The description assumes that MEMA is the active memory and MEMB the backup one. The allocation in the memories follows the frame subdivision into modules and zones (FIG. 2): each memory row can contain the states of the multiplexers in BSM relevant to a module of the second type, which represents also the finest frame subdivision. Writing into the memories is carried out by processing information messages A01 ... A07 of protocol PRA received through INC2. Message field ADDR1 supplies the address of the memory row where GMS writes the states of fields BSM1 ... BSM6. The states relevant to frame zones T3, T4 (videoconference in gathering, switched communications) are written into both memories at the same time, so that state changes in these zones become active immediately within the frame following the one in which the master station has sent the new states. The states relevant to the other frame zones are written on the contrary into the backup memory only so as to allow them to be checked before use. Upon command from earth (message A17 of protocol PRA) in a following frame, the backup memory becomes active (and vice versa), so that the new states become active. Besides, since each channel of zones T1, T2 is equal to three modules of the second type (3 memory rows) and each videoconference channel in gathering of zone T3 occupies in the frame 48 modules of the second type (48 memory rows), the relevant states of the multiplexers in BSM will be written only in the first row (dashed in FIG. 9) among those available for each channel, that is every third row in zones T1, T2 and every 48th row in zone T3, to reduce writing times and reading error probabilities. On the contrary, the channels in zones T4, T5, T6 have a length equal to a single module of the second type, and hence writing into the memory can take place in each of the relevant lines. No state is written in zone T1 concerning channel RB, which is completely managed by time base BT (FIG. 1), which both generates the channel and addresses the demodulators in BSM in the corresponding frame time. Once writing is over, command A17 of memory exchange is sent from earth: the backup memory, where the new states have just been written, becomes active and supplies matrix BSM with the new switching plan. The memory which previously was active becomes the backup memory: the new states have to be copied therein for check purposes. To this end, GMS, when decoding the information messages received from block INC2, reads from code field CD1 and address field ADDR1 information relevant to the frame zone and the memory block where the states have to be written (memories MEMA and MEMB are to be considered as subdivided, for the operations of copying and reading for data requests, in blocks of 48 rows each). Hence there are provided three buffer registers into which GMS writes upon the arrival of the information messages. In the first register it writes the addresses of the block relevant to frame zone T2; in the second the addresses of the blocks relevant to zone T3, if dedicated to semi-permanent videoconference connections; in the third the addresses of the individual words relevant to zones T5, T6 and to channel CH. In the copying operation the active memory is addressed during reading by the contents of the three buffers, in the time slots not allotted to the reading by time base BT (FIG. 1) of the states intended for matrix BSM. The state blocks read are then coped at the same address in the backup memory. Once the copying operation is over. GMS prepares and sends to earth the acknowledgment message of memory exchange occurred. Said acknowledgment message contains the information of which frame zone and blocks have been copied.

(2) Execution of commands given by the master station through channel CH.

In accordance with the command message types in protocol PRA, GMS carries out the following operations:

it carries out the already-examined memory exchange, by supplying interface INTM (FIG. 3) with suitable exchange signals, as will be explained hereinafter;

it updates the values of borders F1, F2, F3, on the basis of command messages A11, A12, A13 of protocol PRA. To this purpose GMS presets three internal registers apt to memorize the updated value of the three borders. The commands of variation of the position of borders F1, F2 implicitly comprise the further command of active/backup memory exchange;

it writes into columns F1, F2, of memories MEMA, MEMB a logic level identifying the position of the homonymous borders, as shown also in FIG. 9, with the following procedure: it addresses the backup memory with the border values to be updated, present in the corresponding internal registers and deletes the previously-written identifying logic level; then it addresses the memory row(s) with the new values of borders F1 and/or F2 and writes into the corresponding column the new identifying logic level; hence it carries out the memory exchange and repeats the same updating procedure updating in the new backup memory; finally it prepares and sends onto FMC a signal acknowledging the border updating for each message received.

The identification of borders F1, F2 in memories MEMA, MEMB serves for addressing the multiplexers in matrix BSM, since in correspondence with such borders the channel length in the frame changes (3 modules of the second type for frame zone T2, 48 for zone T3, 1 for the other zones). Besides, GMS sets up a TV connection on the basis of command messages A14, A15, A16. GMS presets two internal registers wherein it writes the identities of the uplink demodulator in RF1 (FIG. 1) and the downlink modulator in RF2 involved in the TV connection. This information is sent to interface INTM (FIG. 3) and hence to matrix BSM, as we will see later. Hence GMS writes into the active and backup memories the information relevant to the frame point in which the TV channel ends. The procedure carried out is similar to the one just described by which border points F1, F2 are detected. The memories comprise a column TV (FIG. 9) where GMS writes, at the address supplied by command message A16, a logic level identifying the frame point at which TV channel ends. This information, as will be seen, is to be supplied to block BS (FIG. 1) which, for TV channel duration in the frame and for the connection involved, inhibits bit flow synchronisation. Once the operations relevant to TV connection are over, GMS sends to earth the three relevant acknowledgment messages, in the informative field of which it writes again, for checking purposes, the identities of the transponders involved in the connection and the end point of the TV channel in the frame. In addition, GMS prepares and sends the messages replying to state requests of protocol PRA.

The information requested is read by GMS either in the backup memory (blocks of frame zone states) or in its internal registers (border values, information on TV connection, active memory identity) and is written in the information fields of the reply messages already examined in connection with FIGS. 5 and 6.

(3) Execution of on-board checks and possible alarm signal generation.

Before updating the values of borders F1, F2, F3, GMS checks the new values. More particularly GMS checks that relation $F1 \leq F2 \leq F3$ is met, and besides that each border lies within the maximum limits allowed. In case of negative check, it sends an alarm signal to block GTLC which transforms it into alarm conditions AL12, AL13. before updating the states in memories MEMA, MEMB, GMS checks the new states relevant to frame zones T2, T3, T4. More particularly, GMS checks that the address present in the information message receives actually belongs to the frame zone indicated in the code field of the message, by comparing said address with the limits of said zone stored in its internal registers. If the comparison result indicates that the address is out of the limits of said zone, GMS sends an alarm signal to block GTLC, which converts it into the alarm indication AL8 described above.

GTLC is a functional block managing the dialogue of the controller with the telecontrol and telemetering station TLCS (FIG. 1) through uplink channel TLC and downlink channel TLM. Said dialogue takes place according to protocol PRB during normal operation and according to protocol PRB* during degraded operation. GTLC receives through channel TLC and interface INTB and decodes command and state request messages (protocols PRB, PRB*) and information messages (protocol PRB*), and then it manages the addressing memories of matrix BSM, executes commands and on-board checks, and signals alarms. First GTLC changes the controller operation from normal to degraded operation. Command messages C9, B16...B18 and B112 in protocol PRB are sent from earth. As a consequence, GTLC sends command C9 to the preprocessor which is disabled, hence it disables interface INC2 and the degraded operation is started. The return to normal operation occurs when GTLC receives command message B113 in protocol PRB*: then all previously disabled modules are activated again; subsequently command messages B13 ... B15 in protocol PRB are sent which restart the checks carried out by interface INC2. Under normal operation conditions GTLC carries out the following operations:

(1) Preprocessor operation management.

GTLC sends to interface INC2 and hence to the preprocessor command messages C1 ... C3, and receives the possible replies, formed by counter states, it sends to earth through acknowledgment messages DLW4, one for each counter, as already described. GTLC can also set, in the alarm message, the alarms of fields AL1...AL4 coming from the preprocessor, and of fields AL5...AL7 coming from interface INC2. Besides, GLTC replies to message B24 by sending to earth the preprocessor command state word, it writes into the information field of state message DLW4.

(2) Execution of further commands.

GTLC, dependant on commands B11, B12 enables or does not enable the check of the alarm which can be sent by interface INTM as a result of the parity check on the data stored in memories MEMA, MEMB: if necessary, GTLC sets alarm signals AL10, AL11 in the alarm message. GTLC sends to earth an acknowledgment message after execution of command B11.

GTLC, dependent on commands B19, B110, controls the exchange between active and backup memory. For this purpose it updates in an internal register the command state, namely the information on whether the memory exchange must take place at the beginning of the next frame or of the next superframe. When the master station supplies block GMS with memory exchange message A17, GTLC sends block block INTM the relevant command in correspondence with the subsequent frame or superframe, on the basis of the contents of said register. GTLC sends to earth the messages acknowledging the execution of commands B19, B110. When receiving state request message B23, GTLC sends a state message DLW4 containing in the information field the contents of the registers above. Besides, after the request message of B22 type. It sends a state message DLW4, containing in the information field the identity of the memory which is active at that instant: said information is contained in an internal register of GTLC which is updated by GTLC at every memory exchange.

GTLC, when receiving command message B111 relevant to the demodulator redundancy function, memorizes the corresponding state in a register and besides sends it to interface INTM which executes the corresponding command, as will be explained later. Besides, after demodulator state request message B21, it sends a state message with said register contents.

(3) Alarm message composition and transmission.

GTLC can receive alarm signalling from blocks GMS, INC2, INTM, INTB. The alarm word is sent only when there are actually one or more signallings at the same time. Under degraded operation conditions, GTLC carries out the following functions partly replacing those of inhibited block GMS:

(1) Management of addressing memories of matrix BSM.

The control of the addressing memories of BSM directly passes to telecontrol station TLCS which sends through channel TLC information messages B31 ... B37. yet, in this case there are no states concerning frame zones T3, T4 (videoconferences in gathering and telephone switching operations), which are lacking under degraded operation conditions: in fact, since channel TLC is slow, it would be impossible to use it to send such information messages which concern connections to be established within a single frame. On the contrary it is possible, only by passing to degraded operation, to change the master station, by sending information messages B35, B37. Before updating the states in addressing memories, GTLC checks whether the addresses of the new states actually belong to the corresponding frame zones, in the same way as described for block GMS under normal operation conditions. In case of negative comparison, GTLC generates alarm condition AL8. Memory writing occurs as described with reference to block GMS, taking into account that now it always concern the only backup memory, since there is no information relevant to frame zones T3, T4. Also memory updating modalities are the same already examined for block GMS.

(2) Execution of the commands which under normal operating conditions are executed by block GMS and which do not concern the preprocessor. More particularly said commands concern: memory exchange, border updating and check, TV connection setting-up and check, reply to state requests, check of the new states before memory updating.

(3).Execution of commands already carried out under normal operation, which do not concern the preprocessor. More particularly, these commands concern: parity check and exchange between active and backup memory, active memory identity check, alarm message sending.

INTB is a functional interface handling bidirectional transit of the messages arriving from channel TLC and directed to block GTLC and of the messages generated by GTLC to be sent on channel TLM. INTB carries out the following checks on the messages arriving on channel TLC:

check, in each message, of the equality of field HD1, or HD2, or HD3 in the three words forming the message, and of the presence of the right numerical sequence in fields SQ11 . . . SQ33; and check, in each message, of the equality of the two fields of CD1, or CD2, or CD3, and besides of the appurtenance of the code in said fields to a table of permitted codes present tin an internal memory area: two tables exist, the one relevant to normal operation and the other relevant to degraded operation of the controller. In the case of a negative check, the message is ignored and INTB generates an alarm signalling which is then transferred to field AL9 of the alarm message. For downlink messages coming from GTLC, INTB only times the forwarding onto channel TLM.

GIOT is a functional block generating downlink channel IOTD, sent via bus BC1 to matrix BSM. GIOT consists of a memory area storing the fixed bit configuration relevant to said channel, which is addressed during reading directly by time base BT (FIG. 1) through bus BC2 in the suitable frame interval and is switched by matrix BSM towards the modulators forming downlink frames.

INTD denotes a block designed to set up channel FMC at each frame. INTD comprises a memory with a fixed area storing the heading of channel FMC, and an area which can be modified at each frame where INTD composes data field DAT, by coding according to the already-examined downlink protocol PRD the messages in protocol PRA arriving from block GMS. More particularly, INTD triplicates acknowledgment messages of form DLW1 and state messages of formats DLW3 (c), DLW4 (d), leaving the others unchanged. In addition, it fills up the possible space remaining in field DAT with messages IDLE. INTD renders channel FMC available on bus BC1; FMC is addressed in reading directly from time base BT (FIG. 1) through bus BC2 within the suitable frame interval and is switched by matrix BSM towards the modulators forming the downlink frames. INTD is active only during normal operation.

Figure 10:
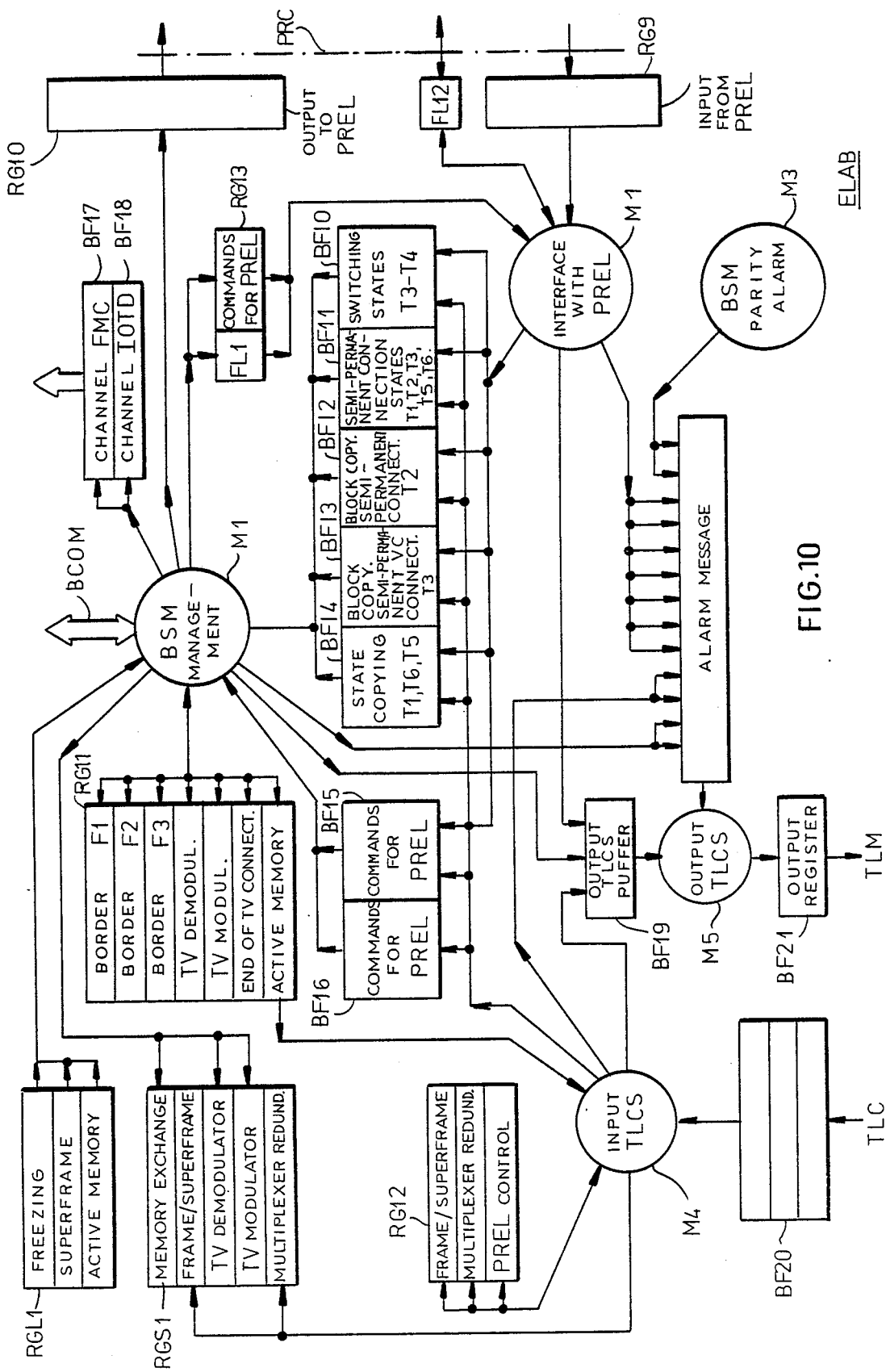
FIG. 10 shows a scheme of the application modules of the microprogram of unit ELAB.

The operations carried out by ELAB are implemented by a stored microprogram subdivided into application modules M1 . . . M5 hereinbelow described with reference also to FIG. 10 showing the data flow among said modules as well as the main registers and memory areas involved. Each module has two states: a normal and a degraded state, corresponding to normal or degraded controller operation.

Module M1: Interface with PREL

This module is active only under normal state. First it manages replay message transfer from preprocessor to processor. The transfer is carried out word by word through register RG9 with alternate cycles of writing/-reading by the processor/preprocessor according to the known hand shake technique: each reading or writing operation is accompanied by a preliminary check and by a subsequent change of the logic level of a condition signal (FL2 in FIG. 10) indicating both successful writing of a word by the preprocessor, and corresponding successful reading by the processor. The contents of the counters present in the fifth and sixth word of the reply message is used to control the input of the following word.

M1 starts reply and command checks (b), (c) in interface INC2 (FIG. 8), described above, possibly generating alarms AL6, AL7. Then it checks and decodes the contents of the messages in protocol PRA: it checks fields HD, SQ, CD, as already seen for the functions of block GMS (FIG. 8) and possibly generates alarm AL8; it also checks whether the code in field CD belongs to a table of permitted codes.

On the basis of the message type, M1 carries out the alreadydescribed checks on the values of borders F1, F2, F3, possibly generating alarms AL12, AL13, and on the actual appurtenance of the addresses of the new states to the corresponding frame zones, generating in negative case alarm AL8. The alarms generated are then written into the alarm message register.

Further it writes into "output TLCS" buffer BF19 (FIG. 10) the possible words of reply to state requests arriving from the preprocessor; furthermore it writes possible alarms AL1 . . . AL4, present in the sixth word of the reply message, into the alarm message buffer.

Then M1 decodes messages in protocol PRA according to the following procedure. It writes the information messages into two buffers BF10, BF11 (FIG. 10): messages A03, A04 relevant to frame zones T3, when devoted to videoconferences in gathering, and T4 are written into BF10; all other messages A01, A02, A05, A06, A07 are written into BF11. The messages are written into the buffers as shown in FIG. 11: with respect to the structure of messages ULW1 of FIG. 5, fields HD, SQ, CD are reset to zero. The buffers have a capacity of 20 terns of 16-bit words. Therefore BF10 stores the states which are to be written into both memories MEMA, MEMB (FIG. 9), while BF11 stores the states which are to be written into the backup memory only.

Two further buffer memories BF15, BF16 (FIG. 10) are provided: BF16, of the capacity of eight 8-bit words, stores the command words for the preprocessor; BF15, of the capacity of 8 terns of 16-bit words, stores the words of the command and state request messages for the processor. BF15 can be written both by module M1, when the messages arrive in protocol PRA, and by module M4 when the messages arrive in protocol PRB. Module M1 writes said messages as shown in FIG. 12: with respect to the structure of messages ULW2, ULW3 of FIG. 5, fields HD, SQ and the redundancy of field CD are reset to zero.

Three further buffer memories BF12, BF13, BF14 serve for the block copying already described in connexion with block GMS (FIG. 8). The three buffers are managed in concatenated manner by a reading pointer and a writing pointer to avoid writing the address of, and hence copying the same block many times. BF12 contains the addresses of the blocks of frame zone T2; BF13 contains the blocks of frame zone T3, when devoted to semi-permanent videoconference connections; BF14 contains the addresses of the words of frame zones T1, T5, T6, which words are copied individually and not by blocks. BF12 and BF13 have each a capacity of 64 block addresses; BF14 has a capacity of 206 word addresses.

Each address in the three memories corresponds with the block or word to be copied. At the address corresponding to the block to be copied there is written the address of the following block to be copied, so as to link together the various addresses. A writing pointer will contain the address of the current block to be copied, while the reading pointer will contain the address of the next block to be copied.

As will be described hereinafter, the above buffers, with the exception of buffer BF10 relevant to switching states, can be written also by module "input TLCS" with the same modalities.

Module M2: BSM management (1) Operations carried out in normal state.

First, check (a) mentioned with reference to block INC2 (FIG. 2) is carried out on the processor-preprocessor dialogue. At each frame, module M2 reads the first command word present in buffer BF16 (previously written by module "input TLCS") and writes it into the output register RG10 towards preprocessor, and into another internal register RG11 together with a condition signal FL1 which is used, as mentioned, to check the dialogue existence. In case of lack of dialogue, M2 generates alarm AL5 and writes it into the alarm message register. RG11 is then read by module M1 to carry out check (c) on the command correctness. In correspondence with a new superframe, a new command word for the processor is read, if such a new word exists in buffer BF16, otherwise the existing one is refreshed. Then module M2 checks first in buffer BF10 and then in buffer BF11 whether information messages are present. If new states are present, M2 writes them in memories MEMA, MEMB (FIG. 9) with procedures already partly described with reference to block GMS (FIG. 8). FIG. 13 shows the actual state location in memories MEMA, MEMB, where each line is one-byte wide. The information relevant to a frame module of the second type, corresponding to one row in FIG. 9, is contained in four consecutive bytes; for each byte module M2 calculates and writes parity bit P in position 6, while position 7 is not used. Positions 0–5 in the fourth byte are generally "0"; positions 0–2 are used to write a "1" in correspondence with borders F1, F2 and the TV connection end point. Writing of switching states into the active memory is carried out in the time slots wherein them memory is not read by time base BT (FIG. 1), as will be described with reference to FIG. 14. For writing operations, module M2 reads field ADDR1 (FIG. 11) in buffer BF10 or BF11, addresses the first byte of the corresponding set of four bytes (FIG. 13) in memories MEMA and/or MEMB and writes into such bytes the successive fields BSM1 . . . BSM6 adding parity bits P. As seen, the execution of said operations relevant to information messages does not gives rise to downlink acknowledgment messages. Module M2 then executes the commands written in processor command buffer BF15, which commands can arrive from both station TLCS and master station MS. If there is a memory exchange command A17, module M2 writes an exchange enabling bit in one of registers RGS1 for the dialogue with interface INTM (FIG. 3), which are located in INTM. The exchange will be effected by INTM in correspondence with the next frame or superframe, depending on a logic level present in another register RGS1, written by module "input TLCS" upon reception of command message B19 or B110. This module writes the information on the memory exchange enabling state also into another internal register RG12. INTM besides writes a bit identifying the active memory into a register RGL1. After the memory exchange, module M2 copies in blocks the contents of the new active memory into the new backup memory in correspondence with the new frame or superframe on the basis of the information it reads in register RG12. The identification of superframe beginning is written by interface INTM into a register RGL1, as will be seen hereinafter. In the time slots wherein the active memory is not read by time base BT, module M2 reads in said memory and writes in the other the blocks whose addresses are read in buffers BF12, BF13, and the words whose addresses are read in BF14. Once the copying operation is over, module M2 prepares a message DLW1 acknowledging the occurred exchange, as mentioned in connection with block GMS (FIG. 8), triplicates said message in accordance with downlink protocol PRD and writes it into buffer memory BF17 devoted to messages for channel FMC. If buffer BF15 contains messages A11, or A12, or A13, module M2 updates the corresponding borders F1, F2, F3, as already described with reference to block GMS (FIG. 8). The new border values are written into respective internal registers RG11 (utilized also by module M1 for the checks on border values) and are also used by module M2 to address the active and backup memories and to write the corresponding identifying bit (F1, F2) into the fourth byte (FIG. 13). At the end of this procedure, M2 prepares a message DLW1 acknowledging the border change, triplicates said message in accordance with downlink protocol PRD and writes it into buffer memory BF17. If buffer BF15 contains messages A14. A15, A16, module M2 starts the procedure for establishing a TV connection. It writes into registers RGS1 and RG11 the identities of uplink demodulators in RF1 (FIG. 1) and of downlink modulator in RF2; interface INTM (FIG. 3) will then read the identities stored in RGS1 and will set up the connection. The information of message A16 relevant to the frame point where TV channel ends, which is also the address of the corresponding word in the active and backup memories, is copied into a register RG11 and is also used by module M2 to address the memories and to write a bit into the fourth byte (TV, FIG. 13) with a procedure similar to that used for writing bits F1, F2. At the end of this procedure three messages DLW1 are prepared acknowledging establishment of TV connection, which messages are triplicated in accordance with downlink protocol PRD and written into buffer BF17. If buffer BF15 contains a message BF12, module M2 inhibits the interrupt signal which cyclically enables module M3. If buffer BF15 contains a message B16 or B17 or B18, modules M2 inhibits the microprogram parts, carried out by modules M2 and M1, relevant to checks (a), (b), (c) on the processor/preprocessor dialogue. These messages are sent from station TLCS to avoid that after a continued error detection, channel TLM is saturated by a continuous emission of the corresponding alarm signal, already acknowledged at earth. The checks can be resumed if buffer BF15 contains messages B13, B14, B15: in this case module M2 prepares corresponding messages DLW1 acknowledging the check resumption and writes them into "output TLCS" buffer BF19. Module M2 executes also the conversion from normal to degraded operation of the entire controller: on channel TLC there are sent in sequence command messages B16, B17, B18, B112, which are written by "input TLCS" module M4 into buffer BF15, and preprocessor inhibition message C9, written into buffer BF16. Module M2 writes message C9 in buffers RG10, RG11, then it inhibits checks (a), (b), (c) with the just described procedure and then changes the state of all application modules. More particularly module M1 is disabled. At the end of the procedure, module M2 prepares a message DLW1 acknowledging the conversion and writes it into buffer BF19. Module M2 generates also state messages in reply to state request messages it reads in buffer BF15. The following remarks can be added to what already said. In reply to messages A21, A22, A23, module M2 addresses the corresponding block, or the corresponding word, in the backup memory with the contents of the message information field, reads the corresponding states and forms state messages DLW2, DLW3, DLW4, already examined, which are then written into buffer BF17. In reply to messages A24 . . . A210, module M2 addresses the corresponding register RG11 and writes its contents into information field INF4 of state message DLW4 it writes then into buffer BF17. Messages of formats DLW3, DLW4 are then triplicated in accordance with downlink protocol PRD. M2 also generates channels FMC and IOTD, i.e. it performs the functions of block GIOT and INTD of FIG. 8. Said channels are composed in buffer registers BF17, BF18 which will be read in the suitable frame time, as it will be explained hereinafter.

(2) Operations carried out in degraded state.

In this state there is no dialogue with the preprocessor, since module M1 is disabled. Hence buffer registers RG10, RG11, FL1, BF10, BF16 are not used. There is no dialogue with master station MS (FIG. 1) as far as control channels CH, FMC, IOT are concerned, hence buffer registers BF17, BFF18 are not used. Now buffer registers BF11 . . . BF15 are written only by "input TLCS" module which receives messages in protocol PRB*. Module M2 checks the presence of information messages in buffer BF11. If new states are present, it writes them into the backup memory with the same procedures used in normal state. Module M2 executes then the commands written in BF15. Upon reception of command message B47, it carries out the exchange between active and backup memories with consequent copying of the new active memory into the backup memory with the same procedure used in the normal state. The downlink acknowledgment message DLW1 is now written into buffer BF19. Upon reception of command messages B41, B42, B43, module M2 updates borders F1, F2, F3; upon reception of messages B44, B45, B46, it establishes the TV connection with the same procedures as in normal state. The corresponding downlink acknowledgment messages are now written into buffer BF19. Upon reception of command messages B48, B49, module M2 enables or inhibits parity bit check in the active and backup memory with the already described procedures. Module M2 carries out also the conversion for degraded to normal operation of the whole controller: command message B413 in protocol PRB* is sent on channel TLC, followed by messages B13, B14, B15 and by one of messages C1 . . . C8 in protocol PRB. Module M2 writes message C1 . . . C8 into buffers RG10, RG11, and then, with a procedure dual to that followed in normal state, it sets the checks (a), (b), (c) and changes the states of all application modules: more particularly module M1 is enabled again. At the end of the procedure, M2 prepares a message DLW1 acknowledging the conversion and writes it into buffer BF19. M2 also generates state messages in reply to state request messages B51 . . . B510, B514, B515. Now it writes the messages into buffer BFF19.

Module M3. Parity alarm BSM

This module carries out the same functions in both normal and degraded state: when enabled by the interrupt signal arriving from interface INTM, it writes an alarm signal AL10 or AL11 into the alarm message, depending on which of memories MEMA, MEMB has generated the parity error; then it resets the interrupt signal generated by INTM. M3 can be inhibited by module M2, when disables the parity checks.

Module M4. Input TLCS (1) Operations carried out in the normal state.

Module M4 controls the input of the messages in protocol PRB arriving on channel TLC. A FIFO (first-in, first-out) buffer BF20 of 3-word capacity (1 message ULW1, ULW2, ULW3) is provided, which is written by block RF3 (FIG. 1) at the rate of channel TLC and is read word by word by module M4. Module M4 checks and decodes the messages received; it carries out the checks on fields HD, SQ, CD, as already mentioned with reference to block INTB (FIG. 8) and generates, in the case of a negative check, alarm AL9 which it writes into the alarm message buffer. As already mentioned, module M4 writes into buffer BF15 the commands for the processor concerning messages B11 . . . B18, B112 of protocol PRB in accordance with the scheme of FIG. 12, while it writes into buffer BF16 command words C1 . . . C9 for the preprocessor, read in the information field of messages ULW2. The last command word for the preprocessor is also written in the corresponding field of internal buffer memory RG12. By contrast, module M4 directly executes the commands of messages of type B19, B110, B111. M4 reads from the information field of messages B19, B110 the information concerning the enabling of the active/backup memory exchange every frame or superframe, writes again such information into internal buffer memory RF12, and writes a bit identifying such exchange state into register RGS1 of interface INTM (FIG. 3)

which will then carry out the corresponding function. The M4 prepares a message DLW1 acknowledging command execution and writes such a message into buffer BF19. From information field of message B111, M4 reads the demodulator redundancy word and rewrites it into register RGS1 of interface INTM (FIG. 3) which will then carry out the corresponding function. Said information field is also written again into internal memory RG12. M4 prepares then a message DLW1 acknowledging command execution and writes it into buffer BF19. Module M4 replies then to the state requests of messages B21 . . . B24, by preparing a state message DLW4 into the information field of which it writes the corresponding word read from either register RG11 (active memory identity) or the register RG12.

(2) Operations carried outing degraded state.

Module M4 carries out under degraded state conditions all of the functions carried out under normal conditions together with a number of functions which under normal state conditions are carried out by module M1. More particularly, module M4 manages the input of messages from channel TLC, and checks and decodes the messages received as under normal state conditions, with the only difference that now the table of permitted uplink message codes is different, in accordance with protocol PRG*. In the presence of messages B31 . . . B37, M4 checks that the addresses of the new states actually belong to the corresponding frame zones and possibly generates alarm signal AL8; in the presence of messages B41 . . . B43, M4 checks the values of borders F1, F2, F3 with possible generation of alarms AL12, AL13. Hence module M4 decodes the messages received. Information messages B31 . . . B37 are processed as already examined for module M1 and are written into buffer BF11. M4 also writes into buffers BF12, BF13, BF14 the information concerning the copying function and writes into buffer BF15 commands B41 . . . B47, B48 . . . B411, B413, and B51 . . . B510, B514, B515 for the processor. Module M4 directly executes the commands of messages B410, B411, B412 relevant to the memory exchange every frame or superframe, and to demodulator redundancy, as under normal state conditions. In addition it replies to the state requests of messages B511, B512, B513 as under normal state conditions.

Module M5. Output TLCS

Figure 14:
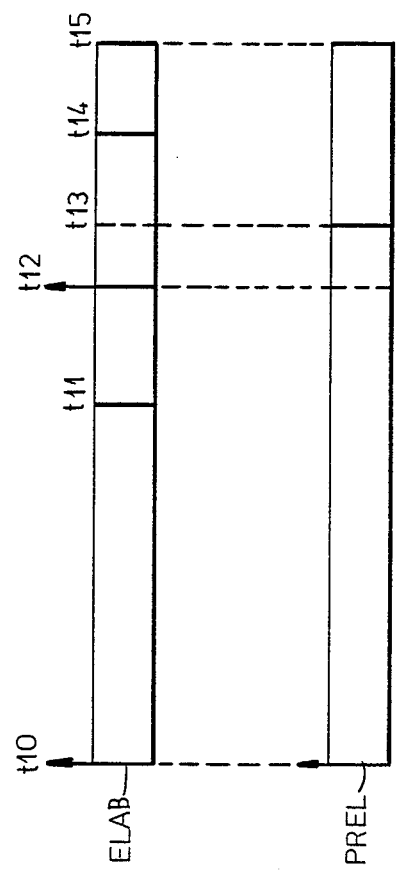
FIG. 14 shows a time diagram relating to the execution times of the microprograms of blocks PREL and ELAB and to their interaction.

This module carries out the same functions in both normal and degraded state. In the presence of at least one alarm in the corresponding register, M5 forms alarm message DLW5 (FIG. 6) and writes it into message output register BG21. Besides M5 reads, word by word, the messages present in buffer BF19 and writes them into register BF21. In the absence of messages to be sent, M5 forms message IDLE in register BF21. BF21 is read at a rate of one word per second by block RF3 (FIG. 1) which generates channel TLM. FIG. 14 shows the time sequence according to which each the various application modules of the processor microprogram are carried out during the frame, as well as the time allocation of the execution of the preprocessor micropogram. At frame beginning instant t10, time base BT (FIG. 1) generates a frame synchronism pulse which is fed as interrupt signal both to preprocessor PREL, which starts the operations of the only microprogram application module, and to processor ELAB which starts the operation carried out by module M2 (management of BSM), which operations end at instant t11. At instant t12, which must follow t11, the processor ends its operations and supplies the processor with an interrupt signal starting module M1 (interface with PREL): then in t12 the message exchange between preprocessor and processor starts; said exchange ends at instant t13, where also the microprogram of PREL ends; PREL passes to a state of waiting for a new frame beginning interrupt. At instant t14 the operations of module M1 of ELAB end, while the frame ends at t15.

Intervals between t11 and t12 and between t14 and t15 are used by ELAB to carry out, if necessary, application modules M3, M4, M5. More particularly, module M3 is activated if an interrupt signal of parity alarm coming from block INTM (FIG. 3) is present; modules M4 and M5 are activated by the interrupt signals generated by interface RF3 (FIG. 1) with 1 second periodicity, which is the periodicity of message transit on channels TLC and TLM, and are carried out in time sharing in the free spaces even of a plurality of subsequent frames comprised in 1 second.

The application modules of ELAB are then started by interrupt signals with the following priority:
frame interrupt, starting module M2;
interrupt from PREL, starting module M1;
interrupt from INTM, starting module M3;
interrupt from RF3 (FIG. 1), starting modules M4 and M5.

Figure 15:
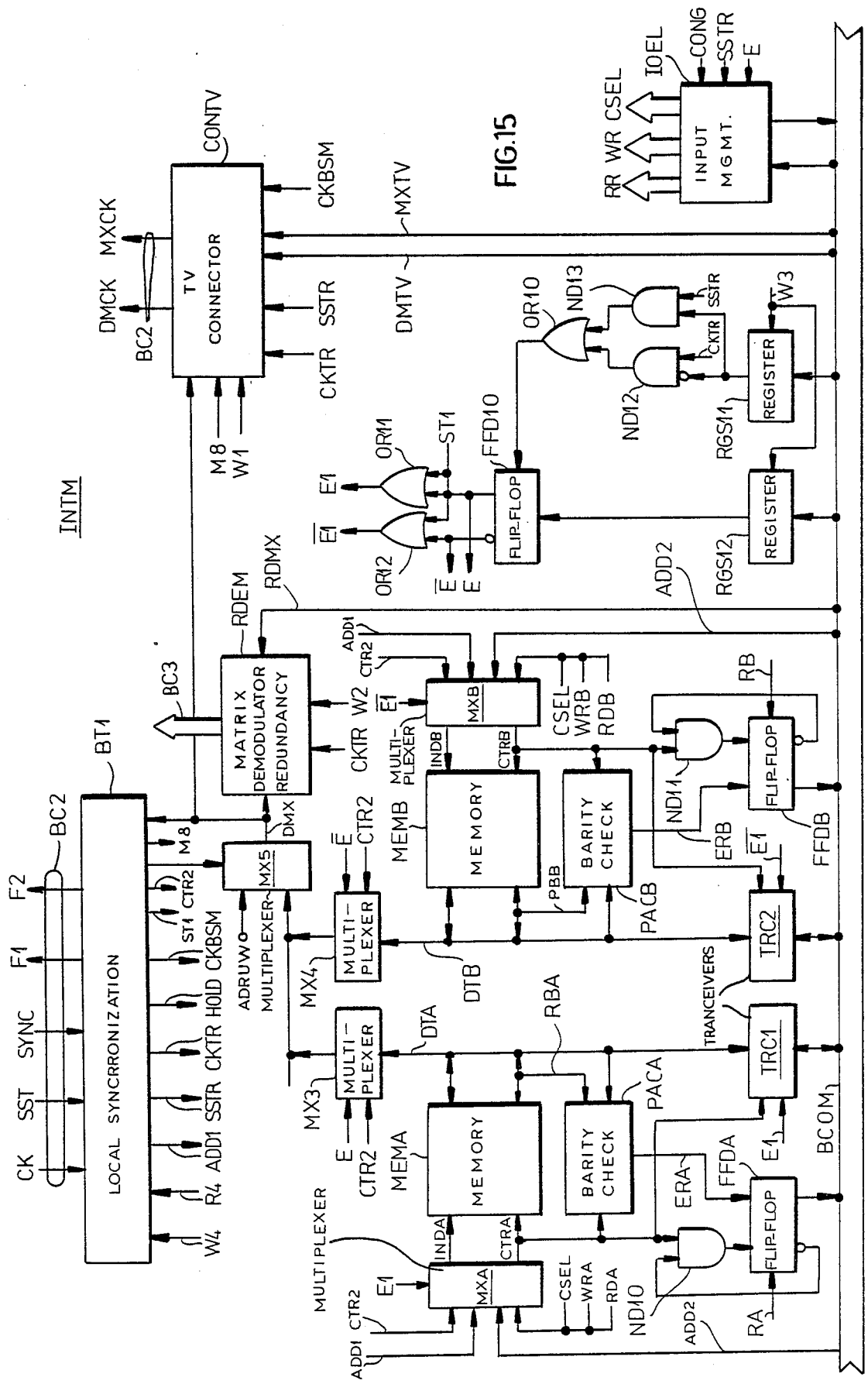
FIG. 15 shows a circuit diagram of block INTM of FIG. 3.

FIG. 15 shows the circuit diagram of interface INTM.

MEMA, MEMB are the read/write memories storing the switching states of matrix BSM; data allocation in said memories has already been described with reference to FIGS. 9 and 13.

DTA, DTB denote the data memory buses conveying the six state bits in each word and the parity bit PBA, PBB of the respective word; the eight bit is unused.

Addresses INDA, INDB and control signals CTRA, CTRB for reading, writing and selecting the addressed memory units are supplied by multiplexers MXA, MXB, and can arrive either form block BT1 (addresses ADD1, control signals CTR2) or from processor ELAB (FIG. 3); in the latter case addresses ADD2 are supplied directly via common bus BCOM of ELAB, while control signals CSEL, WRA, RDA (for memory MEMA), CSELT, WRB, RDB (for memory MEMB) are supplied through interface circuit IOEL.

Data buses DTA and DTB can be connected to bus BCOM through bidirectional couplers TRC1, TRC2; signals E1, E1 activate the connection, while reading control signals RDA, RDB, when present on connections CTRA, CTRB determine coupling direction.

PACA, PACB denote two known circuits for checking the parity bit present in the words stored in MEMA, MEMB. As seen, the parity bit is generated by preprocessor ELAB, when the latter writes the various words in the memories. When said memories are addressed for reading, the read control signals on connections CTRA, CTRB enable PACA, PACB, respectively, which generate again the parity bit relevant to the state bits on buses DTA, DTB, respectively, and compare such parity bit with the parity bit PBA, PBB read in the memories. In case of discrepancy, PACA, PACB generate a parity error bit ERA, ERB fed to the data input of a D-type flip-flop FFDA, FFDB, storing the corresponding bit. The clock signal for FFDA, FFDB is the logic AND, carried out by gates ND10, ND11, of read control signal on connections CTRA, CTRB and on the complement output of the respective flip-flop; in present of parity-error bit, the complement output becomes "0" thereby inhibiting the clock signal. In presence of signal RA, RB generated by the processor and fed to the reset input of the flip-flops, the flip-flops are enabled again and the datum present at their true output is read by the processor.

The six state bits, read in memories MEMA, MEMB and present on buses DTA, DTB, are sent, three by three, to the two inputs of respective multiplexers MX3, MX4 and are alternately transferred towards the 3-bit outputs carrying then the state bits of one demodulator of matrix BSM at a time. The switching of MX3, MX4 is controlled by the levels of the read control signal on connection CTR2. The frequency of said signal is the frequency at which one word is read from the memories. The outputs of MX3 or MX4 are fed to an input of a multiplexer MX5 which receives at a second input an address ADRUW of frame synchronization channel RB (FIG. 2); ADRUW is wired within INTM for reliability reasons. Control signal CTR1 selects the input of MX5 to be connected to 3-wire output DMX, so that ADRUW is switched in correspondence with the first module of each frame.

Signals E, E, enabling the outputs of multiplexers MX3, MX4, and signals E1, E1 enabling the outputs of multiplexers MXA, MXB, and the receivers of TRC1, TRC2 determine the modalities of access to memories MEMA, MEMB, more particularly the alternance between active and backup memory, and are generated by a memory-exchange logic circuit, comprising blocks RGS11, RGS12, ND12, ND13, OR10, OR11, OR12, RRD10.

RGS11, RGS12 denote two one-cell registers belonging to register block RGS1 (FIG. 10). The processor writes into RGS11 the information relevant to the memory exchange either every frame or every superframe; in the particular example herewith described, we assume that "1" means exchange at the next superframe, and "0" indicates exchange at the next frame; the processor changes the logic level in RGS12 whenever a memory exchange is to be carried out. The information is read from bus BCOM and written into RGS11, RGS12 when writing signal W3 is present.

The output of RGS12 is fed to the data input of D-type flip-flop FFD10, while the output of RGS11 is fed to an input of AND gate ND13 and, after being complemented, to an input of AND gate ND12. Frame synchronism CKTR is applied to the second input of ND12 and superframe synchronism is applied to the second input of ND13. The outputs of ND12 and ND13 are connected to the inputs of OR gate OR10 supplying the clock signal to flip-flop FFD10. Then, if the logic level at the outputs E, E of FFD10 will switch in correspondence with the following frame or superframe depending on the logic level at the output of RGS11.

Outputs E, E are fed to a first input of OR gates OR11 and OR12 respectively; the second inputs of said gates receive a signal ST1, generated by block BT1, which is "1" in the time intervals in each frame wherein the active memory is not addressed by BT1. The outputs of gates OR11 and OR12 supply signals E1, E1.

In the example described herewith the convention has been adopted that logic "0" of signals E, E1 or E, E1 enables the access to memories MEMA or MEMB by block BT1, controlled by time base BT (FIG. 1), while logic "1" of said signals enables the access by the processor.

As a conclusion, signals E, E (whose switching takes place in correspondence with a new frame or superframe) determine which of the two memories MEMA, MEMB is active and can supply data on bus DMX through multiplexers MX3 or MX4 and MX5. Signals E1, E1, besides performing the functions of E, E, allow the processor to have access also to the active memory (and not only to the backup one), e.g. to write switching states, while that memory is not being read by BT1 (in correspondence with frame zones T1, T2, T3 it is enough to supply only the first state of each channel on bus DMX towards the matrix BSM, letting hence the active available for the processor for the remaining time).

Figure 17:
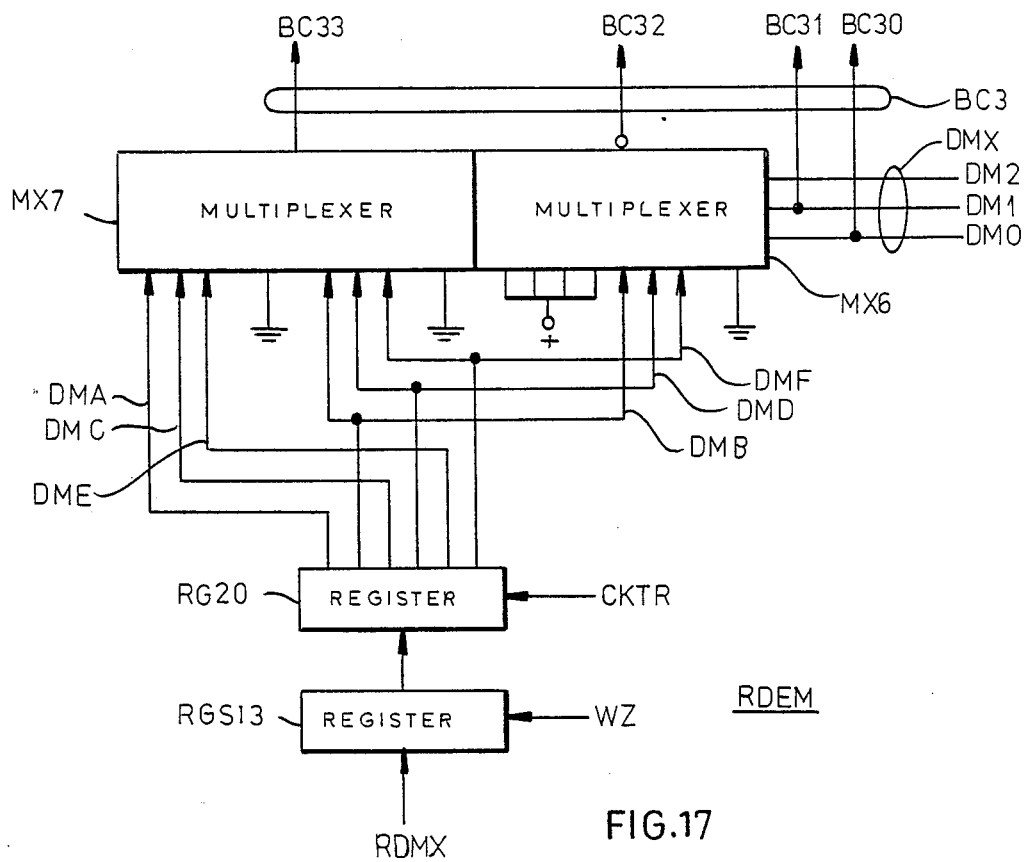

RDEM denotes a block, whose internal structure will be examined with reference to FIG. 17, which performs matrix demodulator redundancy, in case of failure in one demodulator. RDEM, depending on the bit pattern sent by the processor on connection RDMX, possibly modifies the estates present on bus DMX to be sent on bus BC3 to matrix BSM.

Figure 16:
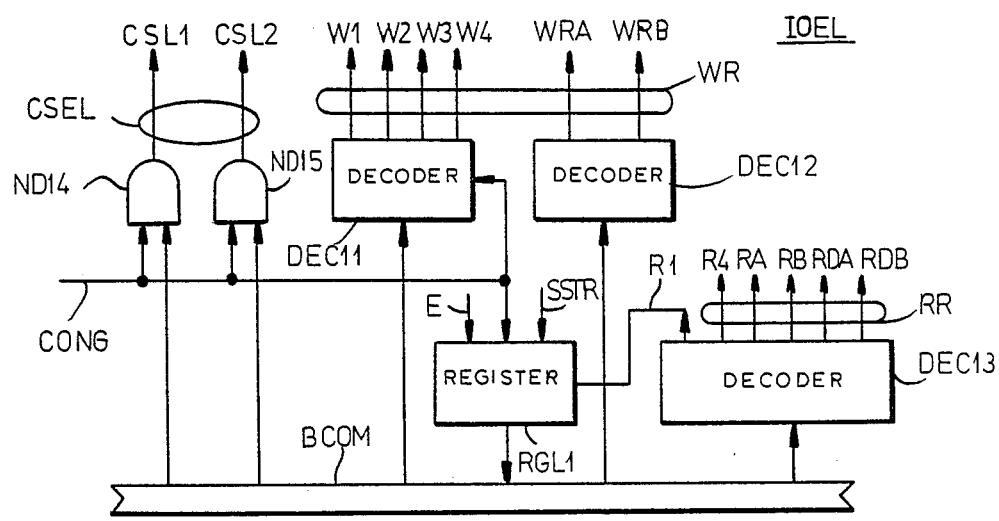
FIGS. 16, 17, 18 and 19 show circuit diagrams of blocks IOEL, RDEM, CONTV, BT1 of FIG. 15.

IOEL denotes a block, whose internal structure will be examined with reference to FIG. 16, managing the input of control signals sent by the processor via buses RR, WR, CSEL and concerning writing into registers and memories, reading and selection of memory units, and data output towards the processor respectively.

Figure 18:
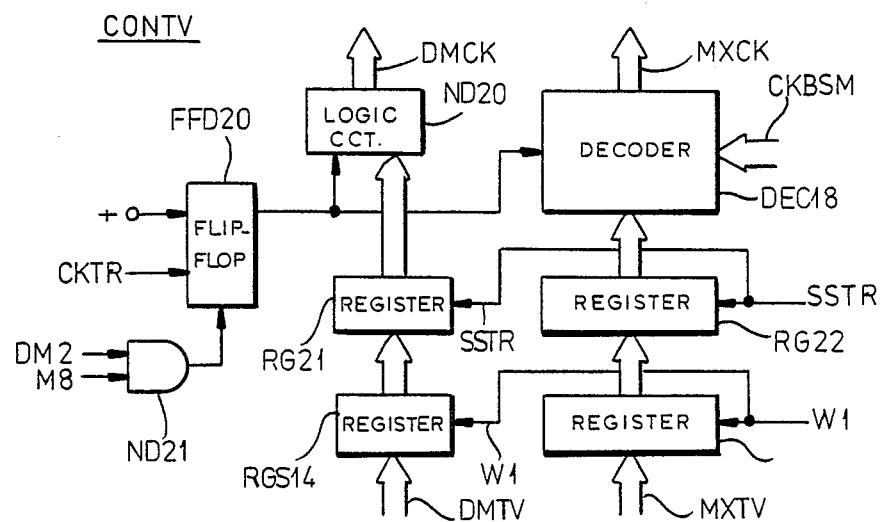

CONTV denotes a block, whose structure will be examined with reference to FIG. 18, which establishes a TV connection between two transponders, i.e. between a demodulator in RF1 and a modulator in RF2 (FIG. 1), depending on the bit patterns received from the processor via buses DMTV and MXTV.

Figure 19:
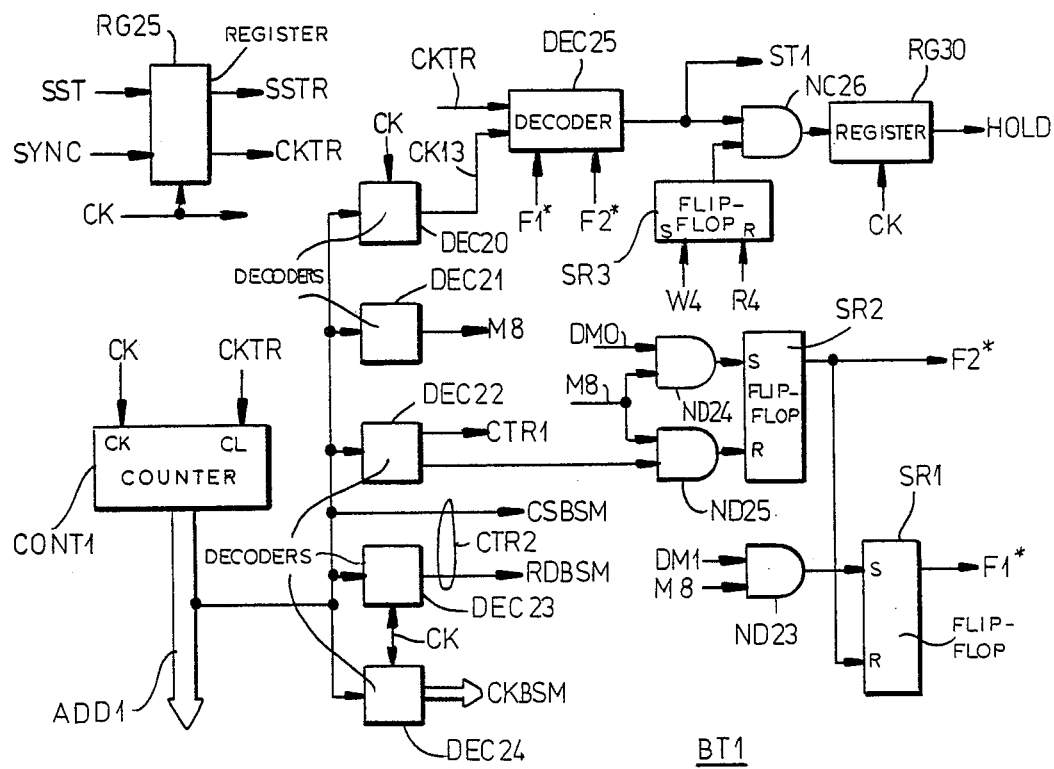

BT1 denotes a block, whose structure will be examined in connection with FIG. 19, which provides for local synchronization on the basis of clock signal CK and of frame and superframe synchronism signals SYNC, SST received from time base BT (FIG. 1).

In FIG. 16 DEC11, DEC12, DEC13 denote conventional decoders converting control signals supplied by the processor on bus BCOM into suitable reading or writing signals. DEC11 generates writing signals W1, W2, W3, W4 for the registers in bank RGS1 (FIG. 10) comprised in blocks RDEM, CONTV, BT1, and for registers RGS11, RGS12 (FIG. 15). DEC12 generates writing signals WRA, WRB for memories MEMA, MEMB, respectively. DEC13 generates reading signals: R1 for register RGL1; R4 for block BT1; RA, RB for flip-flops FFDA, FFDB; RDA, RDB for memories MEMA, MEMB.

ND14, ND15 denotes two AND gates enabling the passage of signals CSL1, CSL2, which select memory units both in MEMA and MEMB and which are supplied by the processor. ND14, MD15 and DEC11 can be inhibited by the presence of freezing signal CONG, active at low logic level, sent onto telecontrol channel TLC and directly supplied by the demodulator in RF3 (FIG. 1). As long as said signal is active, any data writing by the processor into the memories and registers in INTM is inhibited, thus freezing the data present before the activation of signal CONG.

Signals CSL1, CSL2 are present on bus CSEL of FIG. 15, signals W1, W2, W3, W4, WRB on bus WR, signals R4, RA, RB, RDA, RDB on bus RR.

RGL1 denotes the group of 3 one-cell registers, already shown in FIG. 10. RGL1 stores the present state of freezing signal CONG, of signal E selecting the active memory and of superframe synchronism signal SSTR; the latter can be read by the processor through reading signal R1 applied to RGL1, which thus emits SSTR on bus BCOM.

In FIG. 17 RGS13 denotes the register of register bank RGS1 (FIG. 10) where the processor writes the demodulator redundancy word, in correspondence with writing signals W2 coming from IOEL (FIG. 16); a second register FG20, connected in series with RGS13, synchronizes the input of said word with a new frame, as said second register is loaded in correspondance with the frame synchronism pulses CKTR. The redundancy word is composed of 6 bits, herewith denoted by DMA, DMB, DMB, DMD, DME, DMF, and devoted each to a main demodulator; a logic "1" of said bits indicates a failure in the homonymous demodulator. A backup demodulator is provided in matrix BSM fo reach pair of main demodulators and can be operated to replace any of the two main demodulators. DMAB denotes the backup demodulator which can replace main demodulators DMA and DMB, DMCD that replacing DMC or DMD, and DMEF that replacing DME or DMF.

MX6, MX7 denote two 8-input, 1-output multiplexers implementing the redundancy function; the outputs of register RG20 are fed to data inputs, while the select inputs receive the three bits of bus DMX (DM0, DM1, DM2, respectively, from the least to the most significant one). Output bus BC3 carries 4 bits. The least significant bit BC30 corresponds with bit DM0; BC31 corresponds with bit DM1; BC32 is the complemented output of MX6; BC33 is the true output of MX7.

The data inputs of MX6, MX7 are connected in such a way that the following logic levels of the bits on bus DMX:

| DM2 | DM1 | DM0 | State of matrix BSM |
|---|---|---|---|
| 0 | 0 | 0 | Demodulator DMA connected |
| 0 | 0 | 1 | Demodulator DMC connected |
| 0 | 1 | 0 | Demodulator DME connected |
| 0 | 1 | 1 | Channel RB connected |
| 1 | 0 | 0 | Demodulator DMB connected |
| 1 | 0 | 1 | Demodulator DMD connected |
| 1 | 1 | 0 | Demodulator DMF connected |
| 1 | 1 | 1 | Channels IOTD, FMC connected | give rise to the following bit patterns on bus BC3:

| BC33 | BC32 | BC31 | BC30 | State of matrix BSM |
|---|---|---|---|---|
| 0 | 0 | 0 | 0 | Demodulator DMA connected |
| 0 | 0 | 0 | 1 | Demodulator DMC connected |
| 0 | 0 | 1 | 0 | Demodulator DME connected |
| 0 | 0 | 1 | 1 | Channel RB connected |
| 0 | 1 | 0 | 0 | Demodulator DMB connected |
| 0 | 1 | 0 | 1 | Demodulator DMD connected |
| 0 | 1 | 1 | 0 | Demodulator DMF connected |
| 0 | 1 | 1 | 1 | Channels IOTD, FMC connected |
| 1 | 0 | 0 | 0 | Demodulator DMAB connected |
| 1 | 0 | 0 | 1 | Demodulator DMCD connected |
| 1 | 0 | 1 | 0 | Demodulator DMEF connected |

As it can be seen, the first 8 patterns correspond with the normal condition wherein the six main demodulators of matrix BMS are operating and all bits in RG20 are 0; also bit BC33 is always 0, while bit BC32 is equal to DM2. The last three patterns indicate failure conditions: bit BC33 is always "1", BC32 is always "0". If either bit DMA, DMB is "1", demodulator DMAB will be activated; if bit DMC or DMD is "1", demodulator DMCD will be activated; if bit DME or DMF is "1", demodulator DMEF will be activated. Not all failures can be remedied, since it is impossible to replace both demodulators in a pair. By the technique described a bit can be saved for indicate the various states of matrix BSM: in fact three bits are sufficient.

In FIG. 18 RGS14 and RGS15 denote the registers of register bank RGS1 (FIG. 10) wherein the processor writes, in correspondence with writing command W1 supplied through IOEL (FIG. 15), the words relevant to the TV connection. The word identifying the uplink demodulator interested in the TV connection is written through bus DMTV into RGS14, having a 9-bit capacity, while the word identifying the down link modulator is written through bus MXTV into RGS15, having a 6-bit capacity. Said words have a bit "1" in the position corresponding with the demodulator and the modulator involved in the connection.

Registers RG21 and RG22 synchronize with the superframe the words supplied from registers RGS14, RGS15 respectively, since RG21, RG22 are the first registers which are loaded at the superframe synchronism pulse SSTR.

ND20 denotes a block containing as many AND gates as are the output bits of RG21. An input of said gates is connected with a corresponding output of RG21, while the second input of all gates is connected with the output of a D-type flip-flop FFD20. The data input of RRD20 is always "1"; frame synchronism CKTR is applied to the clock input, while the output of AND gate ND21 is applied to the reset input. The inputs of ND21 are bit DM2 of bus DMX (FIG. 15) and signal M8 generated by BT1. The presence of a logic "1" at both inputs of ND21 occurs in correspondence with the frame point at which the TV channel ends. M8 identifies the eighth semibyte of each word of the active and backup memories (FIG. 13), while DM2 is the TV bit. Hence the output of FFD20 is "1" starting from the beginning of each frame and can be rest to "0" by the output of ND21 at the frame point where a possible TV channel ends. The output signal of FFD20 is transferred onto the wire of output bus DMCK of ND20 carrying a bit "1", if any, identifying the demodulator involved in the TV connection. This signal allows time base BT (FIG. 1) to inhibit synchronisation, carried out by block BS, of the bit flow passing through the demodulator of the TV connection, in order not to alter the information for the whole length of the TV channel in the frame.

DEC18 indicates a decoder which inhibits the clock signal of the multiplexer of matrix BSM involved in the TV connection for the duration of the TV channel in the frame. DEC18 receives from block BT1 (FIG. 15) bus CKBSM carrying the clock signals for the six active multiplexers in matrix BSM, which signals are then supplied to time base BT (FIG. 1) on bus MXCK; DEC18 also receives the outputs of flip-flop FFD20 and register RG22. The simultaneous presence of a logic "1" at the output of FFD20 and at an output of RG22 inhibits the corresponding signal present on bus CKBSM for the frame portion allotted to the TV channel.

In FIG. 19, RG25 denotes a register synchronizing the input into BT1 of frame synchronism signal SYNC, emitted onto output KCTR, and of superframe synchronism signal SST, emitted onto output SSTR. Signals SST, SYNC. as well as clock signal CK, are supplied by time base BT (FIG. 1): signal CK has a period which is a submultiple of frame channel time.

CONT1 denotes a counter, advanced by clock signal CK nd reset by frame synchronism CKRT, which supplies the base timing for the whole block BT1. More particularly the most significant output bits of CONT1 form also addresses ADD1 for memories MEMA, MEMB of FIG. 15.

DEC20 denotes a conventional decoder which combines suitable bits of the output of CONT1 and signal CK to generate a signal CK13 whose period follows the subdivision into second type modules in the frame and whose duty cycle is equal to $\frac{1}{4}$. Signal CK13 therefore identifies the first word of each second type module, i.e. the word that in the active memory contains the states of the demodulators of matrix BMS (FIG. 9).

DEC21 indicates a conventional decoder combining suitable output bits of CONT1 to generate signal M8 identifying the eighth semibyte of memory words (FIG. 13).

DEC22 denotes a conventional decoder combining suitable output bits of CONT1 to generate signals CTR1 and ULT identifying the first and the last frame module, respectively.

DEC23 denotes a conventional decoder combining suitable output bits of CONT1 and signal CK to generate reading signal RDBSM for the active memory. CSBSM denotes the most significant output bit of CONT1, which bit is used to select the two active memory units. Signals RDBSM and CSBSM are present on connection CTR2 (FIG. 15).

DEC24 denotes a conventional decoder combining suitable output bits of CONT1 and signal CK to generate clock signal for the multiplexers of matrix BSM. Said signals are supplied onto bus CKBSM. They have a period corresponding to a first type module in the frame, and a cyclic delay of "ON" time with respect to the module beginning.

SR1, SR2 denote two set-reset flip-flops obtaining signals F1*, F2* (which are related with the positions of borders F1, F2) from bits DM0, DM1, already examined with reference to FIG. 17 and coinciding with bits F1, F2 of the homonymous columns of memories MEMA, MEMB (FIG. 9). SR1 is set in the presence of DM1 and M8 (gate ND23) and reset by F2; SR2 is set in the presence of DM0 and M8 (gate ND24) and reset at the end of the frame (gate ND25 receiving signals ULT and M8). Signals F1*, F2* are supplied to a decoder DEC25 generating signal ST1, already examined in the description of FIG. 15 (it is worth mentioning that the access by the processor to the active memory is not possible after border F2). Decoder DEC25 is timed by CKTR and CK13. Signal ST1, through gate ND26 and register RG30, is converted into a signal HOLD enabling the access by the processor; gate ND26 is enabled by a flip-flip SR3 receiving commands W4,R4 relevant to writing and reading by the processor itself.

Figure 20:
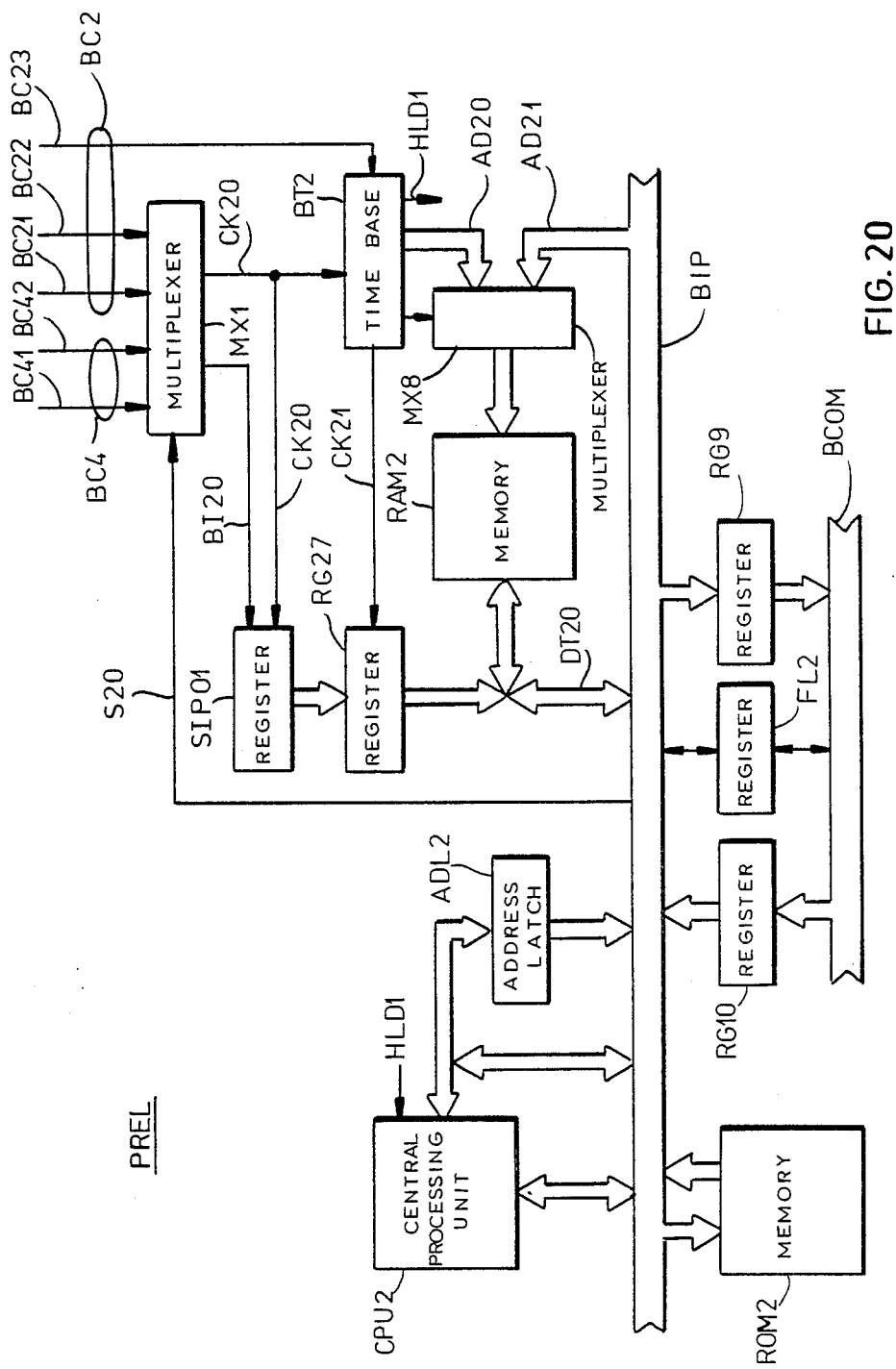
FIGS. 20 and 21 show a practical embodiment of blocks PREL and ELAB of FIG. 3.

FIG. 20 shows an exemplary embodiment of preprocessor PREL whose functional scheme has been described with reference to FIG. 7.

CPU2 denotes a circuit acting as a conventional central processing unit, e.g. an 80C86 microprocessor by Itel. It exchanges commands and data via internal bus BIP and supplies, on said bus, addresses through circuit ADL2 carrying out the known function of address latch.

ROM23 denotes a read only memory, connected to bus BIP and containing the microprogram of CPU2 performing the function already described with reference to FIG. 7.

RG9, RG10, FL2 denote the registers, already shown in FIG. 10, managing the information exchange, in protocol PRC, between processor and preprocessor. Such registers are connected between buses BIP and BCOM (FIG. 15); RG10, of 8-bit capacity, contains the command messages, RG9, of 16-bit capacity, contains the reply messages; FL2 is the condition signal register.

RAM2 denotes a random access memory, usually written and read through bus BIP by CPU2 in known manner; data are supplied on bidirectional bus DT20 and addresses on bus AD21; said buses are parts of bus BIP.

Figure 7:
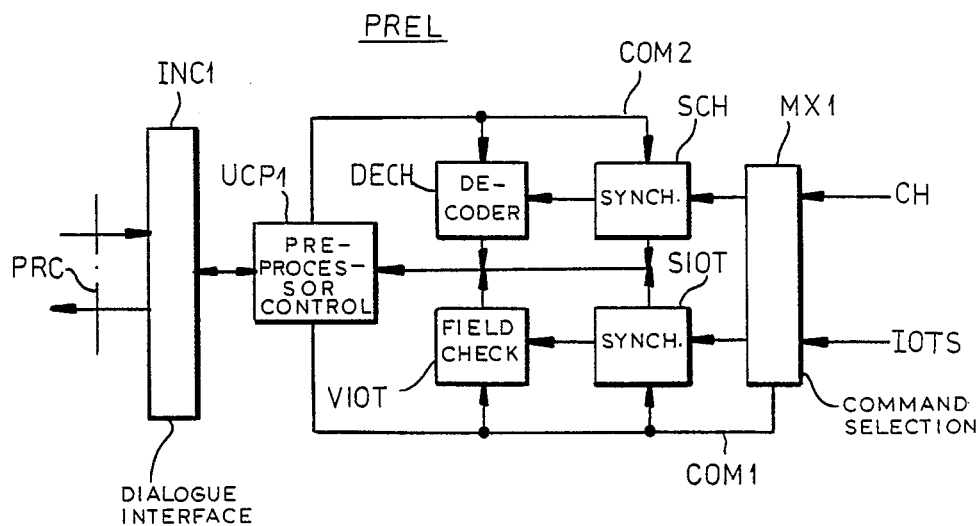
FIG. 7 is a functional block diagram of unit PREL of FIG. 3.

MX1 denotes the multiplexer, already shown in FIG. 7, which controls the input of channels CH and IOTS arriving through bus BC4 from matrix BSM (FIG. 1); said bus has a duplicated structure and comprises buses BC41 and BC42 of 4 wires each. The timing for the input of said channels is supplied by time base BT (FIG. 1) on wires BC21, BC22 of BC2; also the timing is duplicated. The logic level of signal S20, supplied by CPU2 to the select input of MX1, causes the connection of inputs BC41 or BC42 with internal 4-bit bus BI20 and of inputs BC21 or BC22 with wire CK20 carrying the timing signal. SIPO1 denotes a series-in, parallel-out register, which is synchronized by the signal over wire CK20 and converts the 4-bit groups present on bus BI20 into 16-bit words supplied to register RG27.

BT2 denotes a local time base synchronized by the signal on wire CK20. BT2 generates the load signal CK21, with frequency equal to $\frac{1}{4}$ that of the signal over wire CK20, for register RG27. Besides BT2 comprises a counter which generates writing addresses for RAM2, which are supplied on bus AD20. A multiplexer MX8 connects either bus AD20, AD21 to the address input of RAM2, upon a command generated by BT2.

In correspondence with frame periods relevant to channels CH and IOTS (FIG. 2), time base BT (FIG. 1) supplies a signal on wire BC23 of bus BC2, to take over the control of memory RAM2. Said signal is sent to BT2 and causes the internal counter to begin counting, MX8 to switch on address bus AD20, and signal HLD1 to be generated; said signal is sent to hold input of CPU2 to stop writing/reading in RAM2. In these periods the words of channels CH and IOTS, present at the outputs of RG27, are then loaded and written at fixed locations of RAM2 addressed by BT2. Said channels are then read by CPU2 when signal HDL1 is released.

Figure 21:
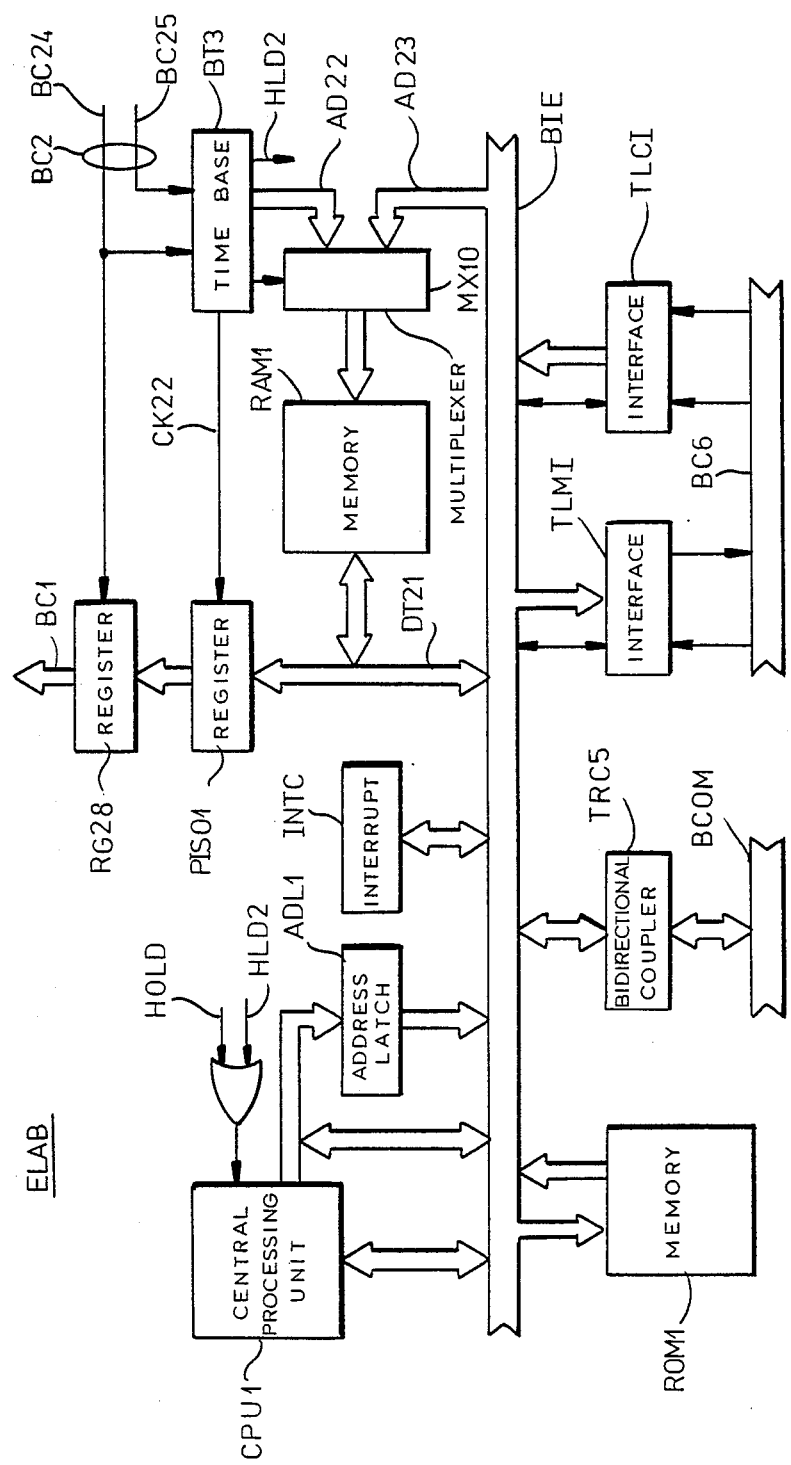

FIG. 21 shows an exemplary embodiment of processor ELAB whose functional scheme has been described with reference to FIG. 8.

CPU1 denotes a circuit acting as a conventional central processing unit, e.g. an 80C86 microprocessor. CPU1 exchanges commands and data on internal bus BIE and supplies, on said bus, addresses through circuit ADL1 acting as address latch.

ROM1 denotes a read only memory, connected to bus BIE, and containing the microprogram executed by CPU1, already described with reference to FIG. 10.

INTC denotes a block acting as interrupt signal controller. INTC is connected to bus BIE wherefrom it receives and manages the various interrupt signals controlling the microprogram execution, already mentioned with reference to FIGS. 10 and 14. INTC can be a series 8259 component made by Intel.

TRC5 denotes a conventional 16-bit bidirectional coupler, allowing data word transfer from bus BIE to bus BCOM (FIGS. 15 and 20), and vice versa.

TLMI denotes an interface circuit for telemetering channel TLM; it basically comprises buffer register BF21 (FIG. 10) having a 16-bit capacity, parallel inputs and serial output on bus BC6 towards interface RF3 (FIG. 1). Register BF21 receives the load signal from CPU1 and the read signal from RF3 which supplies also INTC with the interrupt signal to start module M5 (FIG. 10).

TLCI denotes an interface circuit for telecontrol channel TLC; it essential comprises FIFO buffer BF20 (FIG. 10) with three 16-bit cascaded registers; the first register has serial input from interface RF3 (FIG. 1) via bus BC6, while the output from the last register on bus BIE is of parallel type. To control the input of a 3-word message from channel TLC, RF3 sends a clock signal at bit rate to TLCI which converts it into control signals for the three registers of BF20, in such a manner that the three words are written in the first register and afterwards trasferred into the others; at the procedure end, the first word is in the register connected to bus BIE, the second in the intermediate register, the third in the register, connected to bus BC6, and TLCI generates an interrupt signal sent to INTC for starting module M4 (FIG. 10). The three words are read one at a time upon command of CPU1 and subsequently transferred through the three registers of BF20.

RAM1 denotes a random access memory, usually written and read through bus BIE by unit CPU1 in known manner; the data are supplied via bidirectional bus DT21 and the address via bus AD23; both DT21 and AD23 are part of bus BIE. RAM1 comprises many of the registers shown in FIG. 10, such as BF10 ... BF19, RG11 ... RG13, and other areas used for the program execution.

Additional logic circuitry, described hereinbelow, is provided for the output of channels FMC, IOTD written by CPU1 into registers BF17, BF18 forming fixed locations of RAM1.

PIS01 denotes a register with 16-bit parallel-input and 4-bit serial output synchronized by signal CK22 generated by block BT3.

RG28 denotes a 4-bit register receiving the output of PIS01, which it supplies onto bus BC1 towards matrix BSM (FIG. 1). RG28 is synchronized by clock signal BC24 it receives from time base BT (FIG. 1) via bus BC2.

BT3 denotes a local time base synchronized by the signal on wire BC24. BT3 generates synchronism signal CK22 and comprises a counter generating reading addresses for RAM 1, which are supplied on bus AD22.

A multiplexer MX10 connects either bus AD22, AD23 to address input of RAM1, upon command of BT3.

In correspondence with frame times relevant to channels FMC and IOTD (FIG. 2), time base BT (FIG. 1) supplies a signal on wire BC25 of bus BC2, to take over the control of memory RAM1. Said signal is sent to BT3 and causes the internal counter to begin counting, MX10 to switch on the address bus AD22, and signal HLD2 to be generated and sent as hold signal to CPU1 to stop writing/reading in RAM1. In these time intervals the words of channels FMC and IOTD are read in RAM1, upon command of BT3, and are sent through registers PIS01 and RG28 to the input of matrix BSM (FIG. 1) via bus BC1. Signals HLD2, generated by BT3, and HOLD, generated by local time base BT1 of interface INTM of FIG. 15, are sent to hold input of CPU1.

We claim:

1. An on-board switching controller for a satellite with on-board switching for control of a base band switching matrix with one switching stage and a plurality of multiplexers, said matrix receiving uplink frames and sending downlink frames, said frames being divided into zones (T1 .... T6) including a first zone and a last zone comprising service channels and intermediate zones comprising traffic channels, each of said channels encompassing a certain number of states, said controller cooperating with a telecontrol and telemetering station (TLCS) capable of low-frequency bidirectional dialogue with an uplink telecontrol channel (TLC) and a down link telemetering channel (TLM), each of said channels having a preamble and a data message, said controller comprising:

means for directly receiving from said switching matrix (BSM) and processing said service channels (CH, IOTS) of said uplink frames and for directly supplying said switching matrix (BSM) with the service channels (FMC, IOTD) of said downlink frames, and for receiving via said uplink telecontrol channel (TLC) and processing words for control of operation o the controller and sending on said downlink telemetering channel (TLM) reply words;

a preprocessing unit (PREL) selecting, synchronizing and decoding said service channels (CH, IOTS) of the uplink frames and extracting therefrom decoded messages and provided with a first interface means (INC1, INC2) having first and second elements (INC1 and INC2, respectively), said first element receiving said decoded messages, said preprocessing unit (PREL) being provided with counters;

a matrix interface unit (INTM) comprising two memory units (MEMA, MEMB) storing matrix switching stages, and first control means determining an alternation of said memory units as an active memory unit and as a backup memory unit, respectively, the first control means controlling reading in said active memory unit of switching states and sending a reading of the switching states to said matrix (BSM) and updating switching states in both of said memory units; and a processing unit (ELAB) operatively connected to said preprocessing unit (PREL) and to said matrix interface unit (INTM) and comprising:

said second element (INC2) of said first interface means checking existence and correctness of dialogue with said processing unit and checking veracity of received data messages, second interface means (INTB) for receiving, decoding and checking data messages supplied by said telecontrol channel and for transmitting the telemetering channel, and first decoding and executing means (GMS, GTLC) connected to said first and second interface means (INC1, INC2; INTB) for decoding and executing commands present in data messages receive from said first and second interface means (INC1, INC2; INTB), said first decoding and executing means (GMS, GTLC) managing, an a basis of said commands, a normal operation mode of the controller in which all functions are activated and a degraded operation mode in which said preprocessing unit (PREL) and said first interface means (INC1, INC2) are disabled, said first decoding and executing means (GMS, GTLC) controlling writing of said switching states selectively only into said backup memory unit or into both said memory units while reproducing frame subdivision into said channels and zones;

said first interface means (INC1, INC2) being constructed and arranged in said normal operation mode to:

write switching states to be transferred to both of said memory units (MEMA or MEMB) into a first buffer (BF10), write switching states to be transferred only to said backup memory unit into a second buffer (BF11), write information on frame zones of switching states written in in said second buffer (BF11) into a third buffer (BF12, BF13, BF14), write control words for operation of said processing unit (ELAB) into a fourth buffer (BF15), and send to said second interface means (INTB) alarm messages generated upon a negative result of a check on said dialogue or in a case of overflow of said counters of said preprocessing unit (PREL) or reply messages from said preprocessing unit (PREL), said first interface means being disabled in said degraded operation mode.

2. The controller defined in claim 1 wherein said preprocessing unit (PREL) is provided with means for selecting upon a command given in normal operation mode by the processing unit (ELAB), a first IOTS) and a second (CH) service channel; synchronizing said channels by looking for a synchronism word (UW) contained in the preamble in successive search steps in which a window twice as wide as said word is analyzed and by comparing the analyzed window with a fixed configuration, non-synchronized channels being neglected and causing advance of counters of lack of synchronization; comparing the data message of said first service channel (IOTS) with a fixed configuration, incrementing a counter of discrepancies found out; and decoding the data message of said second service channel (CH) by splitting the message into two interleaved parts and decoding each part first according to a Golay code and then according to a cyclic redundancy code, incrementing a counter of decoding errors, thus obtaining said data messages supplied to the first interface means, said data messages comprising alarms relevant to overflow conditions of said counters.

3. The controlled defined in claim 1 wherein, in said processing unit (ELAB), said second interface means (INTB) is provided with means for, in both operation modes, writing control words for the operation of said processing unit (ELAB) into said fourth buffer (BF15), control words for the operation of the preprocessor unit (PREL) into a fifth buffer (BF15), writing into further registers (RGS1, RGS2) information on the exchange between the active and backup memory and on the identity of the multiplexer to be activated in the matrix, generating alarms in case of negative checks on the messages received from the telecontrol channel, and sending the alarm messages and reply messages received from said first interface means (INC1, INC2), or from the first decoding and execution means (GMS, GTLC) on the telemetering channel; and in said degraded operation mode for writing switching states to be transferred to the only backup memory unit into said second buffer (BF11) and writing information on the frame zones of the switching states written in the second buffer (BF11) into said third buffer (BF12, BF13, BF14).

4. The controller defined in claim 1 wherein, in said processing unit (ELAB), said first decoding and execution means (GMS, GTLC) is provided with means for on the basis of command words read in said fourth buffer (BFG15), determining said normal and degraded operation modes, reading in said first buffer (BF10) and then in said second buffer (BF11) the switching states relevant to the various frame channels, preceded by a corresponding address, also computing a parity bit, and sending them to said interfacing unit (INTM) to which it also sends, at addresses contained in the command words bits identifying of frame positions (F1, F2) where said channel length changes, or wherein a TV channel (TV) ends, sending a command for the exchange between active and backup memory to be executed by said interface unit (INTM) in the subsequent frame or superframe, followed by a command of copying into the new active memory unit, on the basis of the information red in said third buffer (BF12, BF13, BF14), and preparing then messages acknowledging command execution, which are sent by the decoding and execution means onto a third service channel (FMC) of downlink frames.

5. The controller defined in claim 1 wherein said interface unit (INTM) comprises:

means for alternately operating said memory units (MEMA, MEMB) as active backup memory, said units being read and/or written by said processing unit (ELAB) or being read with priority by a time base (BT1) which generates a cyclic addressing (ADD1) in order to send the states to said matrix (BSM);

means (PACA, PACB) for checking the parity bit of the words read in said memory unit, and sending a possible parity error signal to said processing unit (ELAB);

a logic circuit ND12, ND13, OR10, FFD10, OR11, OR12) for memory unit exchange, which circuit is controlled by said first decoding and execution means (GMS, GTLC) and allows reading by said time base (BT1) of the active memory unit only, and the possible reading and/or writing either of the backup memory unit only or of both memory units by the processing unit (ELAB) in the remaining frame time, said remaining frame time being determined by said logic circuit for memory unit exchange, which circuit, on the basis of the information on the channel length carried by said identifying bits (F1, F2) coming from the processing unit (ELAB), enables reading by the time base (BT1) of the first switching states only of each channel;

a redundancy circuit (RDEM) activating matrix multiplexers identified both by states read in the active memory unit by said time base (BT1) and by information on the identity of the active multiplexers*, said information being supplied by said processing unit (ELAB) and being present in further registers (RGS1, GS2); and a circuit (CONTV) for setting up a TV connection and on a basis of a bit identifying the frame position in which a television channel (TV) ends and of the identities of the matrix multiplexers involved in the matrix, supplied by said first decoding and execution means (GMS, GTLC) establishes a fixed connection in said matrix between an input and an output of said multiplexers.

* * * * *